US009423646B2

(12) United States Patent
Nam et al.

(10) Patent No.: US 9,423,646 B2
(45) Date of Patent: Aug. 23, 2016

(54) DISPLAY DEVICE

(71) Applicant: Samsung Display Co., Ltd., Yongin (KR)

(72) Inventors: Jung Gun Nam, Seoul (KR); Takakuwa Atsushi, Hwaseong-si (KR); GugRae Jo, Asan-si (KR); Dae-Young Lee, Seoul (KR); Daehwan Jang, Gwangmyeong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 288 days.

(21) Appl. No.: 14/040,236

(22) Filed: Sep. 27, 2013

(65) Prior Publication Data
US 2014/0313455 A1  Oct. 23, 2014

(30) Foreign Application Priority Data

Apr. 18, 2013 (KR) .................. 10-2013-0043119

(51) Int. Cl.
*G02F 1/1335* (2006.01)

(52) U.S. Cl.
CPC ............ *G02F 1/133526* (2013.01); *G02F 2001/133548* (2013.01)

(58) Field of Classification Search
None
See application file for complete search history.

(56) References Cited

U.S. PATENT DOCUMENTS

| | | | |
|---|---|---|---|
| 5,808,712 A * | 9/1998 | Hishida | G02F 1/133526 349/138 |
| 6,243,199 B1 | 6/2001 | Hansen et al. | |
| 6,288,840 B1 | 9/2001 | Perkins et al. | |
| 2005/0185115 A1 * | 8/2005 | Yee | G02B 6/005 349/95 |
| 2006/0083478 A1 | 4/2006 | Emmons et al. | |
| 2006/0274272 A1 | 12/2006 | Yoshihide et al. | |
| 2009/0180196 A1 | 7/2009 | Li et al. | |
| 2010/0079706 A1 | 4/2010 | Kim et al. | |
| 2011/0242656 A1 | 10/2011 | Seo et al. | |
| 2012/0169972 A1 | 7/2012 | Jung et al. | |
| 2013/0033662 A1 * | 2/2013 | Chung | G02F 1/133528 349/96 |

FOREIGN PATENT DOCUMENTS

| | | |
|---|---|---|
| JP | 2002-122860 | 4/2002 |
| JP | 2004-157159 | 6/2004 |
| JP | 2007-171802 | 7/2007 |
| JP | 2008-102416 | 5/2008 |
| JP | 2008-145664 | 6/2008 |
| JP | 2009-217218 | 9/2009 |
| JP | 2010-091906 | 4/2010 |

(Continued)

*Primary Examiner* — Richard Kim
(74) *Attorney, Agent, or Firm* — H.C. Park & Associates, PLC

(57) ABSTRACT

A display device includes a light providing assembly to provide light, and a display panel to display an image using the light. The display panel includes a first substrate (FS), a second substrate (SS), a liquid crystal layer (LCL), a polarizing plate (PP), a first optical element (FOE), and a second optical element (SOE). The FS includes a pixel region (PR) and a non-PR (NPR) adjacent to the PR. The SS faces the FS. The LCL is disposed between the FS and SS. The PP is disposed between the FS and LCL, and includes grid polarizing layers. The FOE is disposed between the FS and PP, and is configured to redirect a fraction of the light propagating toward the NPR in a first direction. The SOE is disposed between the FOE and PP, and is configured to redirect the fraction of light propagating in the first direction toward the PR.

19 Claims, 20 Drawing Sheets

(56) References Cited

FOREIGN PATENT DOCUMENTS

| JP | 2010-134068 | 6/2010 |
| JP | 2012-080065 | 4/2012 |
| JP | 2012-145833 | 8/2012 |
| KR | 10-2004-0061498 | 7/2004 |
| KR | 10-2008-0019464 | 3/2008 |
| KR | 10-2009-0025794 | 3/2009 |
| KR | 10-2010-0067252 | 6/2010 |
| KR | 10-2010-0133130 | 12/2010 |
| KR | 10-2012-0038863 | 4/2012 |
| KR | 10-2012-0047638 | 5/2012 |

* cited by examiner

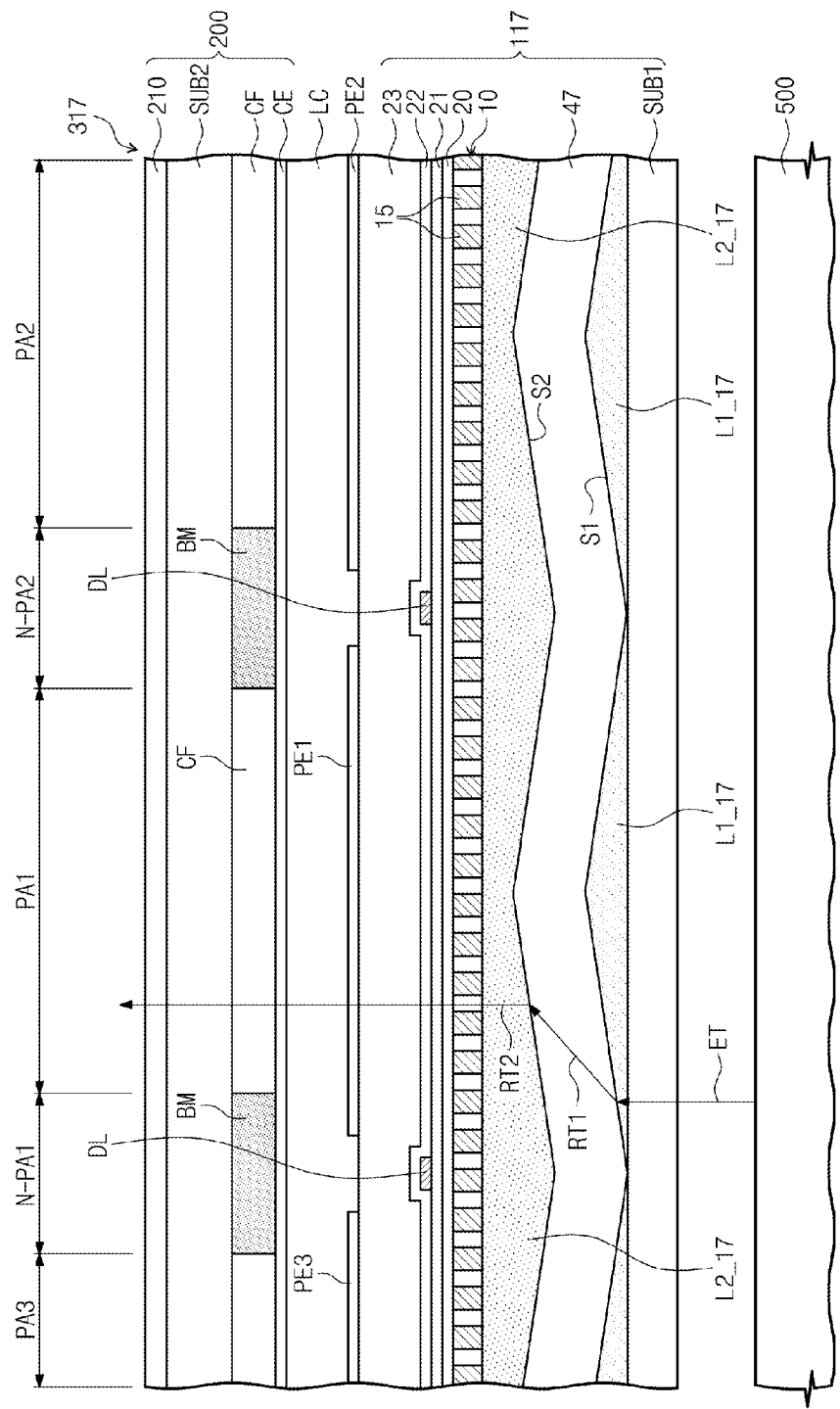

DISPLAY DEVICE

CROSS-REFERENCE TO RELATED APPLICATION

This application claims priority from and the benefit of Korean Patent Application No. 10-2013-0043119, filed on Apr. 18, 2013, which is incorporated by reference for all purposes as if set forth herein.

BACKGROUND

1. Field

Exemplary embodiments relate to display technology, and, more particularly, to a display device including a polarizing plate with grid polarizing layers.

2. Discussion

Conventional non-self-luminous display devices, such as liquid crystal display devices, typically include a backlight assembly configured to generate light to facilitate the display of an image on an associated display panel. The display panel may include a display substrate with a plurality of pixels, an opposite substrate facing the display substrate, a liquid crystal layer disposed between the display substrate and the opposite substrate, and polarizing plates to polarize incident light emitted from the backlight assembly.

It is noted that the aforementioned polarizing plates may be replaced with a wire grid polarizer (or diffraction grating). The wire grid polarizer includes a plurality of grid polarizing layers including a reflective material, such as, for example, a reflective metal material. Each of the grid polarizing layers may longitudinally extend along a first direction, and the grid polarizing layers may be arranged to be spaced apart from each other in a second direction, which may be perpendicular (or substantially perpendicular) to the first direction. It is further noted that the wire grid polarizers may be provided in a structure embedded in the display panel, and they may be more easily manufactured and assembled in association with a conventional display device than conventional polarizing plates.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a display device configured to increase light efficiency from light emitted from a backlight assembly.

Additional aspects will be set forth in the detailed description which follows and, in part, will be apparent from the disclosure, or may be learned by practice of the invention.

According to exemplary embodiments, a display device includes: a light providing assembly configured to provide light, and a display panel configured to display an image using the light. The display panel includes a first substrate, a second substrate, a liquid crystal layer, a polarizing plate, a first optical element, and a second optical element. The first substrate includes a pixel region and a non-pixel region adjacent to the pixel region. The second substrate faces the first substrate. The liquid crystal layer is disposed between the first substrate and the second substrate. The polarizing plate is disposed between the first substrate and the liquid crystal layer. The polarizing plate includes grid polarizing layers. The first optical element is disposed between the first substrate and the polarizing plate. The first optical element is configured to redirect a fraction of the light propagating toward the non-pixel region in a first direction. The second optical element is disposed between the first optical element and the polarizing plate. The second optical element is configured to redirect the fraction of light propagating in the first direction toward the pixel region.

According to exemplary embodiments, a display device includes: a first substrate comprising a pixel region and a non-pixel region adjacent to the pixel region, the pixel region being configured to transmit incident light; a light shielding layer disposed on the first substrate and in association with the non-pixel region, the light shielding layer being configured to block incident light propagating in association with the non-pixel region; a first optical element disposed between the first substrate and the light shielding layer, the first optical element being configured to redirect, in a first direction, at least some of the light propagating in association with the non-pixel region; and a second optical element disposed between the first optical element and the light shielding layer, the second optical element being configured to redirect the at least some of the light propagating in the first direction to propagate in association with the pixel region.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 3-19 are respective sectional views of display devices including display panels, according to exemplary embodiments.

DETAILED DESCRIPTION OF THE ILLUSTRATED EMBODIMENTS

Figure 1:
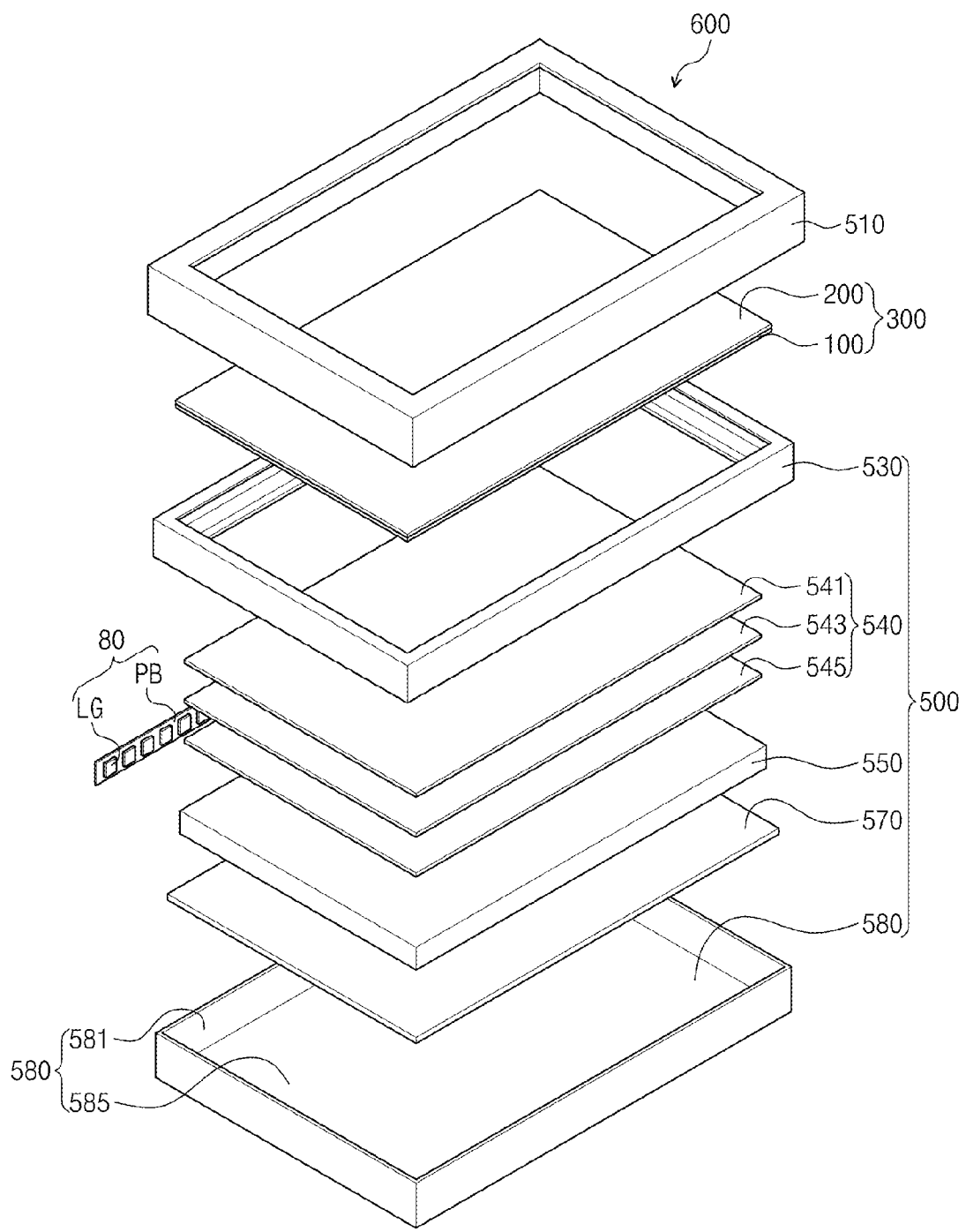
FIG. 1 is an exploded perspective view of a display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Although exemplary embodiments are described in association with liquid crystal display (LCD) devices, it is contemplated that exemplary embodiments may be utilized in association with other or equivalent display devices, such as various self-emissive and/or non-self-emissive display technologies. For instance, self-emissive display devices may include organic light emitting displays (OLED), plasma display panels (PDP), etc., whereas non-self-emissive display devices may include electroluminescent (EL) displays, electrophoretic displays (EPD), electrowetting displays (EWD), etc.

FIG. 1 is an exploded perspective view of a display device 600, according to exemplary embodiments.

Referring to FIG. 1, a display device 600 may include a light providing assembly (e.g., backlight assembly) 500 and a display panel 300. The backlight assembly 500 may be configured to emit light toward the display panel 300. The display panel 300 may be configured to display an image using light emitted from the backlight assembly 500. Although specific reference will be made to this implementation, it is also contemplated that the display device 600 may embody many forms and include multiple and/or alternative components. For example, it is contemplated that the components of the display device 600 may be combined, located in separate structures, and/or separate locations.

According to exemplary embodiments, the backlight assembly 500 may be utilized in association with a non-self-luminous implementation of display device 600. It is contemplated, however, that exemplary embodiments may be utilized in association with self-luminous implementations of display device 600. In this manner, the backlight assembly 500 may be omitted. This is described in more detail in the proceeding paragraphs. Further, although a specific structure of the backlight assembly 500 is shown, it is contemplated that any other suitable structure and/or light providing assembly may be utilized. For descriptive purposes, however, the backlight assembly 500 will be described in association with the illustrated exemplary embodiments.

As shown, the backlight assembly 500 may include a container 580, a light-emitting unit 80, a reflection plate 570, a light guiding plate 550, a mold frame 530, a plurality of sheets 540, and a cover member 510. The container 580 may include a bottom portion 585 and a plurality of sidewalls 581 protruding (e.g., vertically extending) from the bottom portion 585. In this manner, the container 580 may provide a space (or cavity region) configured to contain (or otherwise support) the light-emitting unit 80, the reflection plate 570, the light guiding plate 550, and/or the plurality of sheets 540.

According to exemplary embodiments, the light-emitting unit 80 may include a printed circuit board PB and a plurality of light-emitting packages (e.g., light emitting diode packages) LG mounted on (or otherwise coupled to) the printed circuit board PB. The light-emitting unit 80 may be provided adjacent to a side surface of the light guiding plate 550, such as adjacent to a side surface of one or more of sidewalls 581. In this manner, light emitted from the plurality of light-emitting diode packages LG may propagate towards the light guiding plate 550 and through a side surface thereof.

The light guiding plate 550 may be configured to guide light provided from the light-emitting unit 80 toward the display panel 300. In exemplary embodiments, the light guiding plate 550 may include light guiding patterns (not shown) on a surface of the light guiding plate 550, which may form, for instance, a concavo-convex structure. The light guiding patterns may be used to direct incident light toward the outside of the light guiding plate 500.

The reflection plate 570 may include any suitable reflective material, such as, for instance, aluminum, etc., and may be disposed between the bottom portion 585 of container 580 and the light guiding plate 550. In this manner, a fraction of the light provided by the light-emitting unit 80 that is not incident to the light guiding plate 550 may be reflected by the reflection plate 570 and redirected towards the light guiding plate 550.

According to exemplary embodiments, the plurality of sheets 540 may be provided on the light guiding plate 550. The plurality of sheets 540 may include at least one optical sheet configured to control an optical path of incident light. For example, the plurality of sheets 540 may include a diffusion sheet 545, a prism sheet 543, a protection sheet 541, and/or the like. It is also contemplated that the plurality of sheets 540 may include any suitable number of the aforementioned sheets and/or any suitable number of other forms of sheets that may be utilized to control one or more aspects of incident light. The diffusion sheet 545 may include a lenticular pattern (not shown), and, thereby, may be configured to diffuse incident light propagating from the light guiding plate 550. The prism sheet 543 may include a prism pattern (not illustrated), and, thereby, configured to improve frontal brightness of the display panel 300. The protection sheet 541 may be configured to protect the display panel 300 and the prism sheet 543.

The mold frame 530 may be mechanically, chemically, or otherwise engaged with the container 580 to support (or otherwise house) the reflection plate 570, the light guiding plate 550, and the plurality of sheets 540. To this end, the cover member 510 may include a portion covering an edge of the display panel 300 and may be engaged with the container 580. Further, the cover member 510 may be provided with an opening exposing a display region of the display panel 300.

According to exemplary embodiments, the display panel 300 may be a liquid crystal display panel. In this manner, the display panel 300 may include a display substrate 100, an opposite substrate 200 facing the display substrate 100, and a liquid crystal layer (not shown) disposed between the display substrate 100 and the opposite substrate 200. An exemplary liquid crystal layer is shown and described in more detail in association with FIG. 2B. A structure of the display panel 300 is described in more detail with reference to FIGS. 2A and 2B.

Figure 2A:
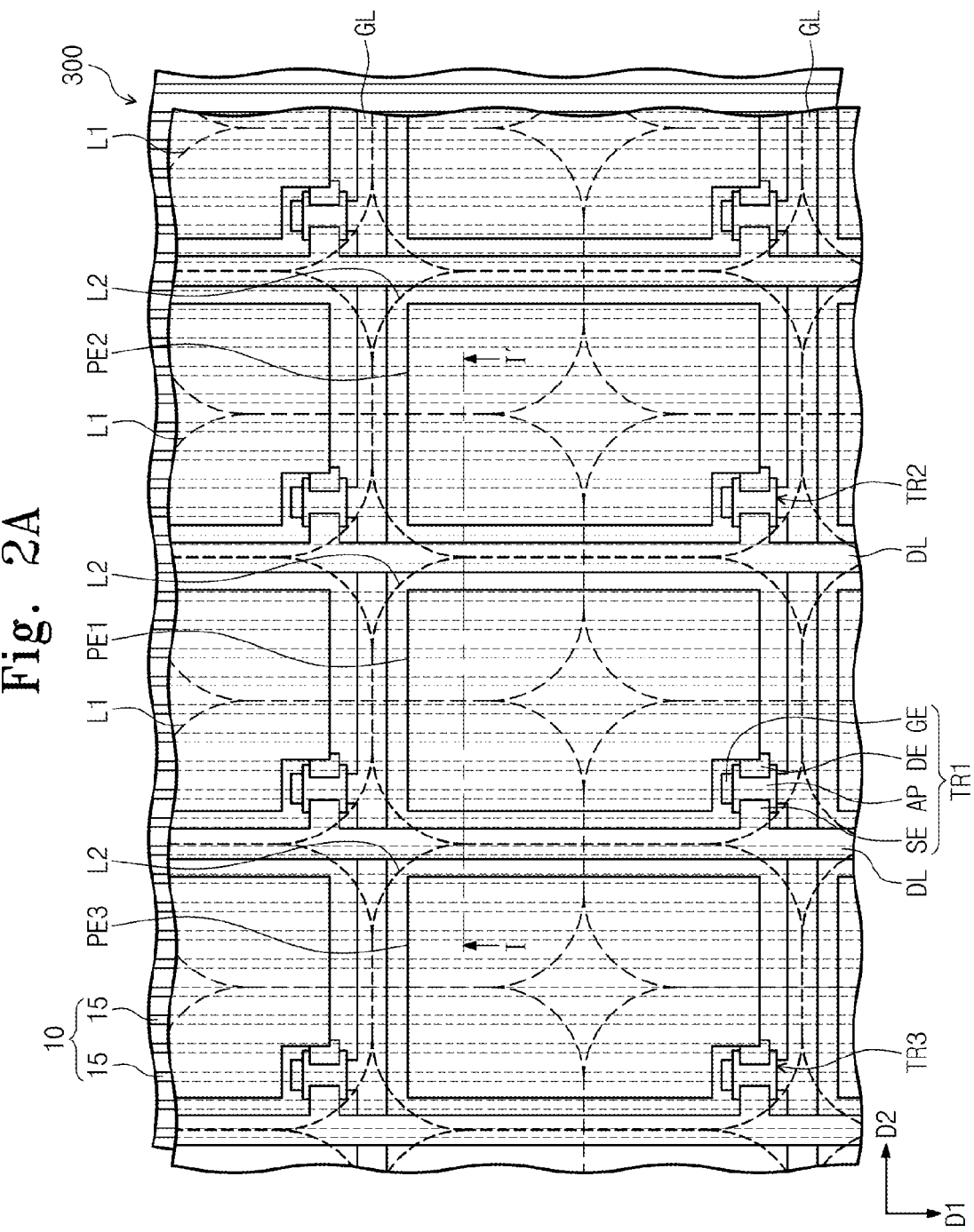
FIG. 2A is an enlarged plan view of a portion of the display panel of FIG. 1, according to exemplary embodiments.
Figure 2B:
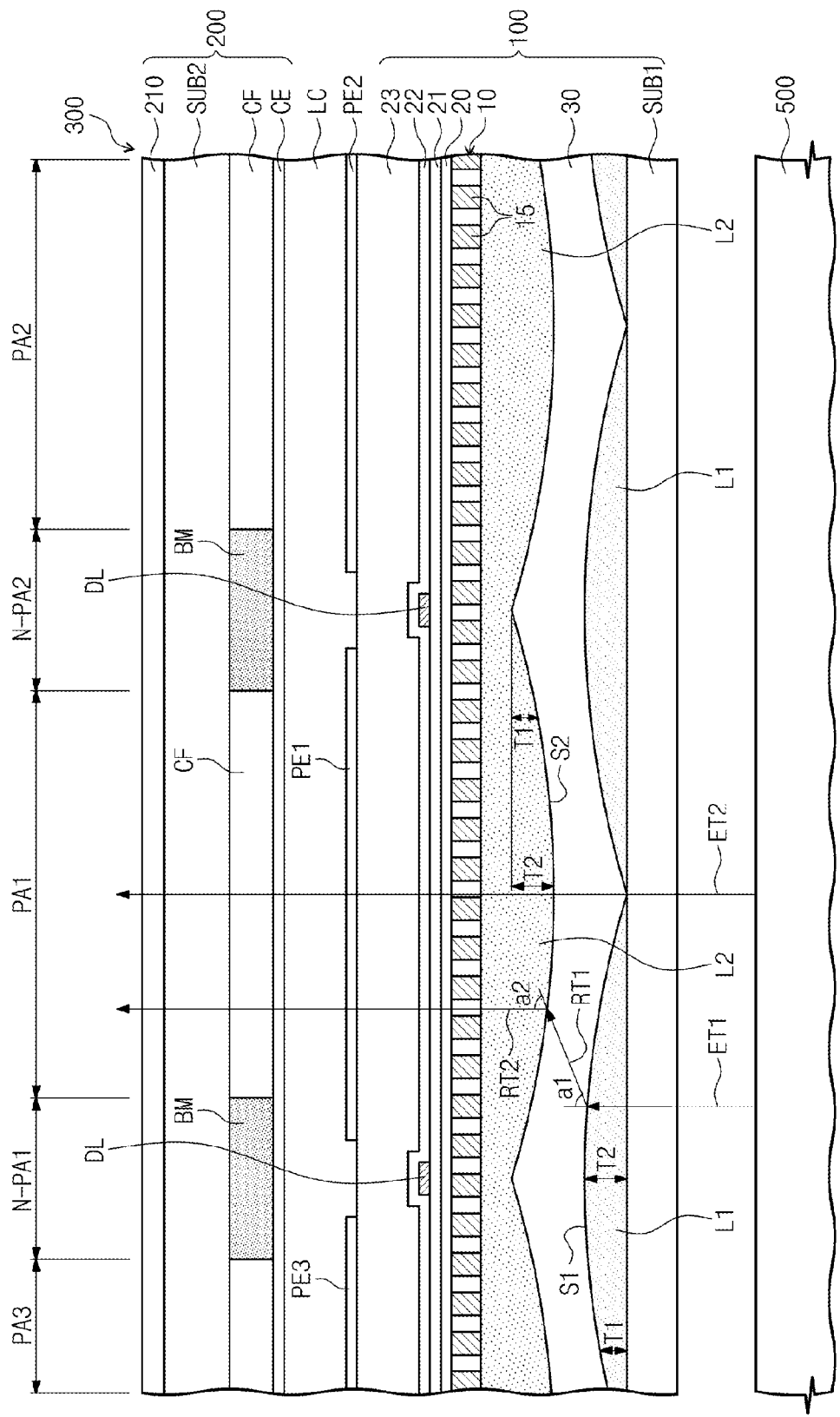
FIG. 2B is a sectional view of the display panel of FIG. 2A taken along sectional line I-I', according to exemplary embodiments.

FIG. 2A is an enlarged plan view of a portion of the display panel 300 of FIG. 1, according to exemplary embodiments. FIG. 2B is a sectional view of the display panel 300 of FIG. 1 taken along sectional line I-I'. It is noted that the elements illustrated in FIG. 2A primarily form the display substrate 100 of the display panel 300. This limited plan view has been provided to reduce the complexity of the drawing and to provide a better mechanism to the understanding of exemplary embodiments described herein.

Referring to FIGS. 2A and 2B, the display panel 300 may include the display substrate 100 and the opposite substrate 200. The display substrate 100 may be disposed closer to the backlight assembly 500 than the opposite substrate 200. In this manner, emitting lights ET1 and ET2 provided from the backlight assembly 500 may sequentially propagate through the display substrate 100 and the opposite substrate 200 to be emitted to the outside of the display panel 300.

According to exemplary embodiments, the display substrate 100 may include a first substrate SUB1, which may be formed from any suitable material, such as, for instance, a transparent insulating material, e.g., glass, plastic, and/or the like. It is noted that the utilization of a transparent plastic substrate SUB1 may provide for both transparency and flexibility characteristics. The first substrate SUB1 may include a plurality of pixel regions (e.g., first to third pixel regions PA1, PA2, and PA3) and a plurality of non-pixel regions (e.g., first and second non-pixel regions N-PA1 and N-PA2).

A plurality of gate lines GL, a plurality of data lines DL, a plurality of switching elements (e.g., first to third thin-film transistors TR1, TR2, and TR3), a plurality of pixel electrodes (e.g., first to third pixel electrodes PE1, PE2, and PE3), a plurality of first optical elements L1, a plurality of second optical elements L2, and a first polarizing plate 10 may be provided on the first substrate SUB1.

The plurality of gate lines GL may be provided on the first substrate SUB1 to be electrically separated (or otherwise insulated) from the plurality of data lines DL. In exemplary embodiments, the plurality of gate lines GL and the plurality of data lines DL may be provided to cross each other, when viewed in a plan view. Each of the gate lines GL may be configured to deliver (or transmit) a gate signal, whereas each of the data lines DL may be configured to deliver a data signal.

Each of the first to third thin-film transistors TR1, TR2, and TR3 may be electrically connected to a corresponding one of the first to third pixel electrodes PE1, PE2, and PE3. The first to third thin-film transistors TR1, TR2, and TR3 are substantially similar and the first to third pixel electrodes PE1, PE2, and PE3 are substantially similar, and, therefore, to avoid obscuring exemplary embodiments described herein, the first thin-film transistor TR1 and the first pixel electrode PE1 will be described below as representative of each of corresponding components previously mentioned.

According to exemplary embodiments, the first thin-film transistor TR1 may include a gate electrode GE, an active pattern AP, a source electrode SE, and a drain electrode DE. The gate electrode GE may be electrically connected to one of the plurality of gate lines GL to receive a gate signal. The active pattern AP may include any suitable semiconductor material, which may be provided on the gate electrode GE. A first insulating layer 21 may be provided between the active pattern AP and the gate electrode GE.

As previously mentioned, the active pattern AP may include any suitable semiconductor material, such as, for example, amorphous or crystalline silicon. It is contemplated, however, that any other suitable material may be utilized in association with the active pattern AP. For example, the active pattern AP may include at least one of various oxide semiconductor materials, such as, for instance, indium gallium zinc oxide (IGZO), zinc oxide (ZnO), tin dioxide ($SnO_2$), indium(III) oxide ($In_2O_3$), zinc stannate ($Zn_2SnO_4$), germanium oxide ($Ge_2O_3$), hafnium(IV) oxide ($HfO_2$), etc., or compound semiconductor materials, such as, for instance, gallium arsenide (GaAs), gallium phosphide (GaP), indium phosphide (InP), etc. It is also contemplated that the semiconductor material may include any suitable semiconductor alloy with, for instance, an adjustable band gap, such as silicon germanium ($Si_{1-x}Ge_x$), indium gallium arsenide ($In_xGa_{1-x}As$), etc.

The source electrode SE may be electrically connected to one of the data lines DL to receive a data signal. The source electrode SE may be provided on the active pattern AP. The drain electrode DE may be provided on the active pattern AP and may be spaced apart from the source electrode SE.

According to exemplary embodiments, a second insulating layer 22 may be provided to cover the plurality of thin-film transistors (e.g., thin-film transistors TR1, TR2, and TR3), and a third insulating layer 23 may be provided on the second insulating layer 22. Although not shown, a contact hole may be formed to penetrate the second insulating layer 22 and the third insulating layer 23. In this manner, the first pixel electrode PE1 may be electrically connected to the drain electrode DE of the first thin-film transistor TR1 through the contact hole. To this end, if the gate signal is applied to the gate electrode GE and the first thin-film transistor TR1 is "turned on," the data signal may be transmitted to the first pixel electrode PE1 through the source electrode SE, the active pattern AP, and the drain electrode DE.

The plurality of first optical elements L1, an auxiliary layer 30, and the plurality of second optical elements L2 may be provided between the first polarizing plate 10 and the first substrate SUB1. The plurality of first optical elements L1 may be positioned between the first substrate SUB1 and the auxiliary layer 30. The auxiliary layer 30 may be positioned between the plurality of first optical elements L1 and the plurality of second optical elements L2. The plurality of second optical elements L2 may be positioned between the first auxiliary layer 30 and the first polarizing plate 10. Further, the plurality of first optical elements L1 and the plurality of second optical elements L2 may be alternatingly arranged with the auxiliary layer 30 disposed therebetween. For instance, a trough between adjacent first optical elements L1 may be vertically (or substantially vertically) aligned with an apex of a second optical element L2. To this end, a trough between adjacent second optical elements L2 may be vertically (or substantially vertically) aligned with an apex of a first optical element L1. To this end, a trough between adjacent second optical elements L2 may be substantially aligned in association with a corresponding non-pixel area, such as the first non-pixel area N-PA1.

Figure 5:
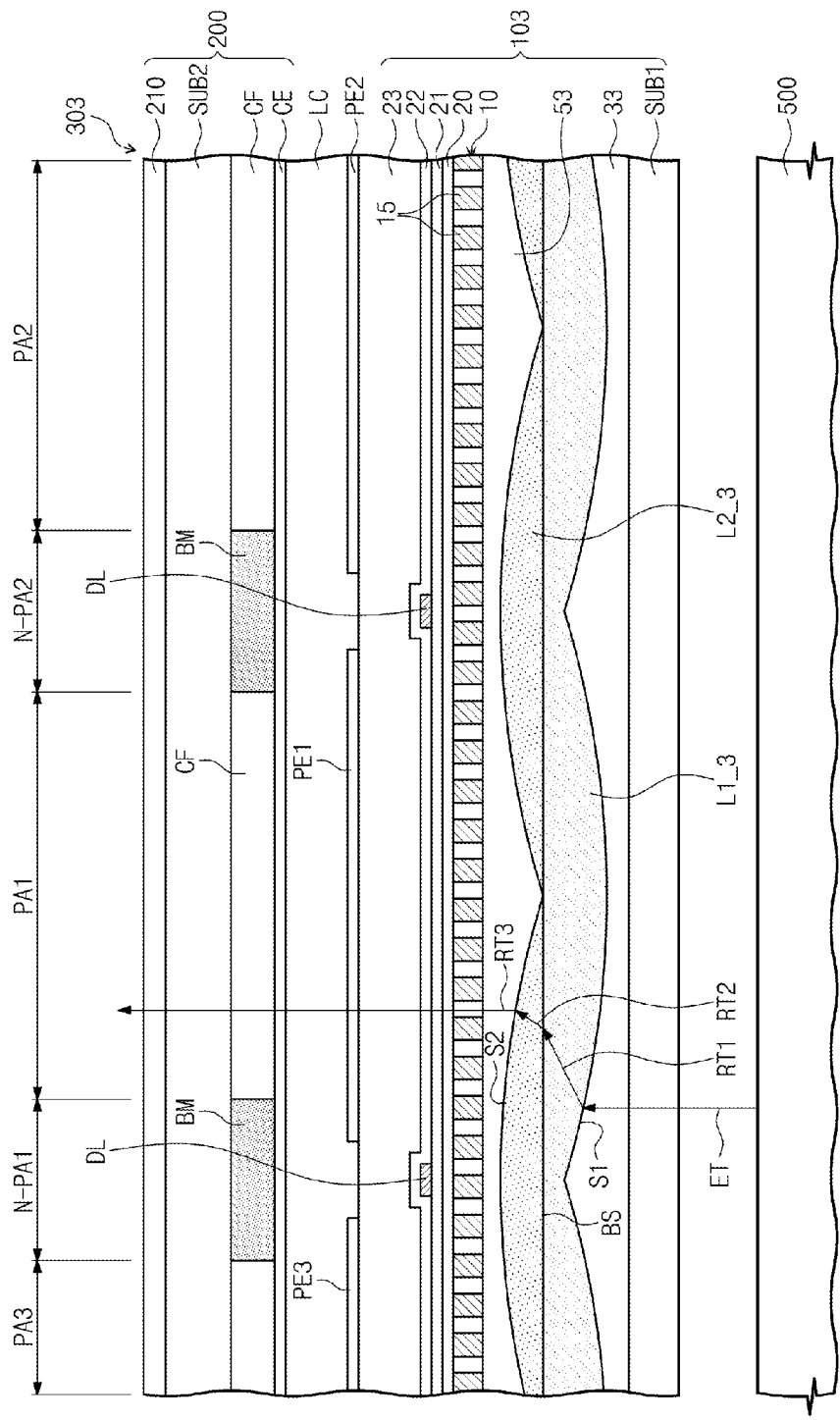

According to exemplary embodiments, each of the first optical elements L1 may be shaped like a lens convexly protruding toward the first polarizing plate 10, whereas each of the second optical elements L2 may be shaped like a lens convexly protruding toward the first substrate SUB1. It is contemplated, however, that the first and second optical elements L1 and L2 may be formed in any other suitable manner, such as, for example, as shown in FIG. 5, where each of the first optical elements L1 are shaped like a lens convexly protruding toward the first substrate SUB1, and each of the second optical elements L2 are shaped like a lens convexly protruding toward the first polarizing plate 10. Again, any other suitable arrangement may be utilized. Furthermore, the lens configurations of the first and second optical elements L1 and L2 may be formed in any suitable manner, such as, for example, in association with Fresnel formations, a saw-tooth formation, etc.

The auxiliary layer 30 may include any suitable highly transparent material, such as, for instance, silicon oxide (SiO). As seen in the sectional view of FIG. 2B, the auxiliary layer 30 may have a curved bottom surface fitted to a profile of the first optical elements L1 and a curved top surface fitted to a profile of the second optical elements L2.

According to exemplary embodiments, the first optical elements L1 are substantially similar, and, therefore, to avoid obscuring exemplary embodiments described herein, the first optical element L1 disposed in association with the first pixel region PA1, the first non-pixel region N-PA1, and the third pixel region PA3 will be described as a representative one of the plurality of first optical elements L1. To this end, the second optical elements L2 are substantially similar, and, therefore, to avoid obscuring exemplary embodiments described herein, the second optical element L2 disposed in association with the first non-pixel region N-PA1, the first pixel region PA1, and the second non-pixel region N-PA2 will be described as a representative one of the plurality of second optical elements L2.

As described above, if each of the first and second optical elements L1 and L2 is shaped like a lens, the first and second optical elements L1 and L2 may have a thickness that decreases with increasing distance from a center (e.g., optical axis). For example, if each of the first and second optical elements L1 and L2 has first and second thicknesses T1 and T2 respectively disposed near an edge portion and a center portion thereof, the second thickness T2 may be greater than the first thickness T1. To this end, it is noted that an overall thickness of the second optical elements L2 may be greater than the overall thickness of the first optical elements L1.

The first optical element L1 may have a first refracting surface S1, which may span a portion of the first pixel region PA1, the first non-pixel region N-PA1, and at least a portion of the third pixel region PA3, when viewed in a plan view. In this manner, the first optical element L1 may overlap a border between the first pixel region PA1 and the first non-pixel region N-PA1 and a border between the first non-pixel region N-PA1 and the third pixel region PA3.

The second optical element L2 may have a second refracting surface S2, which may span a portion of the first non-pixel region N-PA1, the first pixel region PA1, and a portion of the second non-pixel region N-PA2, when viewed in a plan view. In this manner, the second optical element L2 may overlap a border between the first non-pixel region N-PA1 and the first pixel region PA1 and a border between the first pixel region PA1 and the second non-pixel region N-PA2.

According to exemplary embodiments, the first refracting surface S1 may have a curvature that is different from the curvature of the second refracting surface S2. It is contemplated, however, that exemplary embodiments are not limited thereto or thereby. For example, the curvature of the first refracting surface S1 may be substantially equivalent to the curvature of the second refracting surface S2.

It is noted that when light crosses an interface between a first transmission medium having a first refractive index and a second transmission medium having a second refractive index higher than the first refractive index, the light is refracted at the interface between the first and second transmission media. If the light passes through an interface shaped like a refracting surface of a concave lens, the light may be expanded. If the light passes through an interface shaped like a refracting surface of a convex lens, the light may be condensed.

According to exemplary embodiments, if the first emitting light ET1 propagates toward the first non-pixel region N-PA1 and the auxiliary layer 30 has a refractive index higher than that of the first optical element L1, the first refracting surface S1 may serve as a refracting surface of the concave lens. In this manner, the first emitting light ET1 may be expanded by the first refracting surface S1 to be a first refracted light RT1 propagating in a direction that is rotated clockwise by a first angle a1 (which may be an acute angle) with respect to a normal direction of the first substrate SUB1.

It is noted that when light crosses an interface between a first transmission medium having a first refractive index and a second transmission medium having a second refractive index lower than the first refractive index, the light is refracted at the interface between the first and second transmission media. If the light passes through an interface shaped like a refracting surface of a concave lens, the light may be condensed. If the light passes through an interface shaped like a refracting surface of a convex lens, the light may be expanded.

According to exemplary embodiments, if the auxiliary layer 30 has a refractive index greater than the refractive index of the second optical element L2, the second refracting surface S2 may serve as a refracting surface of the concave lens. In this manner, the first refracted light RT1 may be expanded by the second refracting surface S2 to be a second refracted light RT2 propagating in a direction that is rotated counterclockwise by a second angle a2 with respect to a propagation direction of the first refracted light RT1.

In exemplary embodiments, the first emitting light ET1 propagating toward the first non-pixel region N-PA1 may be refracted at the first refracting surface S1 to be directed as the first refracted light RT1 propagating toward the first pixel region PA1 or toward an oblique direction with respect to the normal direction with respect to the first refracting surface S1. Further, as shown in FIG. 2B, the first and second optical lenses L1 and L2 may be provided in such a way that the first angle a1 and the second angle a2 are substantially equivalent to each other. In this manner, the second refracted light RT2 may propagate toward the first pixel region PA1 along the normal direction with respect to the first refracting surface S1.

If the display substrate 100 does not include the first optical element L1 and the second optical element L2, the first emitting light ET1 may propagate toward the first non-pixel region N-PA1, and, as such, it may not be used to display an image, e.g., it may be blocked by, for instance, a light shielding layer BM, which will be described in more detail in the proceeding paragraphs. By contrast, according to exemplary embodiments, the first and second optical elements L1 and L2 may be used to change the propagation direction of the first emitting light ET1 toward the first pixel region PA1. To this end, the first emitting light ET1 may be used to display an image, and, as such, it may be possible to increase the light efficiency of the light emitted from the backlight assembly 500. Further, since the second refracted light RT2 propagates parallel to the normal direction and may be emitted to the outside through the first pixel region PA1, the first pixel region PA1 may have an improved frontal brightness.

As seen in FIG. 2B, the second emitting light ET2 may pass through an interface between a pair of the first optical elements L1 adjacent to each other (e.g., pass through a trough) and be incident to a central region (e.g., optical axis) of the second optical element L2. In this manner, the propagation direction of the second emitting light ET2 may not be changed. To this end, the propagation direction of the second emitting light ET2 may remain parallel to the normal direction with respect to the first reacting surface S1.

According to exemplary embodiments, the first polarizing plate 10 may be provided to face the first to third thin-film transistors TR1, TR2, and TR3 and the first to third pixel electrodes PE1, PE2, and PE3. To this end, an interlayer insulating layer 20 may be disposed between the first polarizing plate 10 and the first insulating layer 20. Further, the first polarizing plate 10 may be provided between the first substrate SUB1 and the liquid crystal layer LC, and, thereby, configured to polarize light propagating from the backlight assembly 500 towards the liquid crystal layer LC.

The first polarizing plate 10 may include a plurality of grid polarizing layers 15 containing any suitable reflective material, e.g., any suitable reflective metal material. In exemplary embodiments, the first polarizing plate 10 may be configured to transmit a fraction of incident light depending on its polarization. Each of the grid polarizing layers 15 may longitudinally extend in (or substantially in) a first direction D1, e.g., a vertical direction. To this end, the grid polarizing layers 15 may be arranged so as to be spaced apart from each other in (or substantially) in a second direction D2, e.g., horizontal direction. If a pitch of the grid polarizing layers 15 is smaller than a wavelength of incident light incident, the grid polarizing layers 15 may serve as a wire grid polarizer or diffraction grating polarizer.

According to exemplary embodiments, the opposite substrate 200 may include a second substrate SUB2, a common electrode CE, a light-shielding layer BM, a color filter CF, and a second polarizing plate 210. The second substrate SUB2 may be formed from any suitable transparent substrate material, e.g., glass, plastic, etc., which may be similar to the transparent substrate material of the first substrate SUB1. The common electrode CE may be provided on the second substrate SUB2, and the common electrode CE may be provided to face the first to third pixel electrodes PE1, PE2, and PE3. In this manner, the liquid crystal layer LC may be disposed between the common electrode CE and the first to third pixel electrodes PE1, PE2, and PE3. In exemplary embodiments, the common electrode CE may be used in conjunction with one or more of the first to third pixel electrodes PE1, PE2, and PE3 to produce an electric field, which may be utilized to control an orientation of liquid crystal molecules (not shown) of the liquid crystal layer LC.

The light-shielding layer BM may be provided on the second substrate SUB2 to correspond to each of the non-pixel regions (e.g., the first and second non-pixel regions N-PA1 and N-PA2). The color filter CF may be provided on the second substrate SUB2 to correspond to each of the pixel regions (e.g., the first to third pixel regions PA1, PA2, and PA3). It is noted that the use of the color filters CF may enable the display device to display a color image.

According to exemplary embodiments, the second polarizing plate 210 may be disposed on a surface of the second substrate SUB2 and, thereby, configured to polarize incident light propagating from the liquid crystal layer LC towards and through the second polarizing plate 210. It is contemplated, however, that any suitable second polarizing plate 210 may be utilized. For example, the second polarizing plate 210 may be provided in the form of a wire grid polarizer (or diffraction grating polarizer), which may be similar to the first polarizing plate 10.

FIGS. 3-19 are respective sectional views of display devices including display panels, according to exemplary embodiments. It is noted that the display devices including the display panels of FIGS. 3-17 are substantially similar to the display device including the display panel of FIGS. 1, 2A, and 2B. As such, to avoid obscuring exemplary embodiments described herein, primarily differences between these display devices will be described in the proceeding paragraphs.

Figure 3:
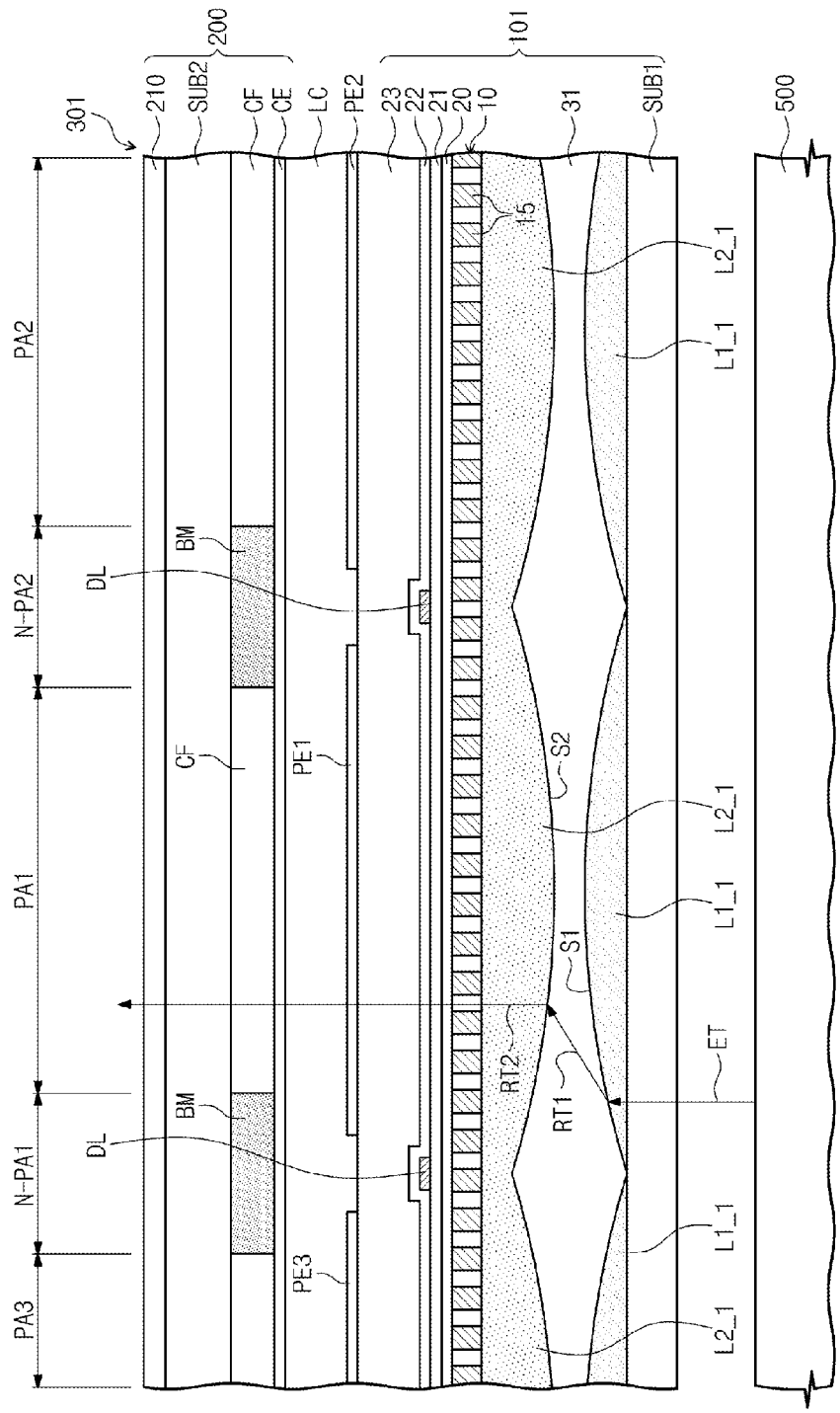

Referring to FIG. 3, a display panel 301 may include a display substrate 101 and an opposite substrate 200. The display substrate 101 may include a plurality of first optical elements L1_1, an auxiliary layer 31, and a plurality of second optical elements L2_1.

As previously described in association with FIG. 2B, the plurality of first optical elements L1 and the plurality of second optical elements L2 were alternatingly arranged with respect to each other with the auxiliary layer 30 disposed therebetween. As seen in FIG. 3, however, each of the plurality of first optical elements L1_1 may be provided to face a corresponding one of the plurality of second optical elements L2_1 with the auxiliary layer 31 disposed therebetween. In this manner, an apex of a first optical element L1_1 may be vertically (or substantially vertically) aligned with a corresponding apex of a second optical element L2_1. To this end, a trough between adjacent first optical elements L1_1 may be vertically (or substantially vertically) aligned with a corresponding trough between adjacent second optical elements L2_1. Further, it is noted that an overall thickness of the second optical elements L2_1 may be greater than the overall thickness of the first optical elements L1_1.

According to exemplary embodiments, each of the first optical elements L1_1 may have a refractive index greater than the refractive index of the auxiliary layer 31. Each of the second optical elements L2_may have a refractive index smaller than the refractive index of the auxiliary layer 31. In this manner, the first refracting surface S1 may serve as a refracting surface of a convex lens, and the second refracting surface S2 may serve as a refracting surface of a concave lens. To this end, an emitting light ET may be refracted at the first refracting surface S1 and the second refracting surface S2, so as to be redirected, and, thereby, propagated toward the first pixel region PA1 in a direction parallel to the normal direction with respect to the first substrate SUB1.

Figure 4:
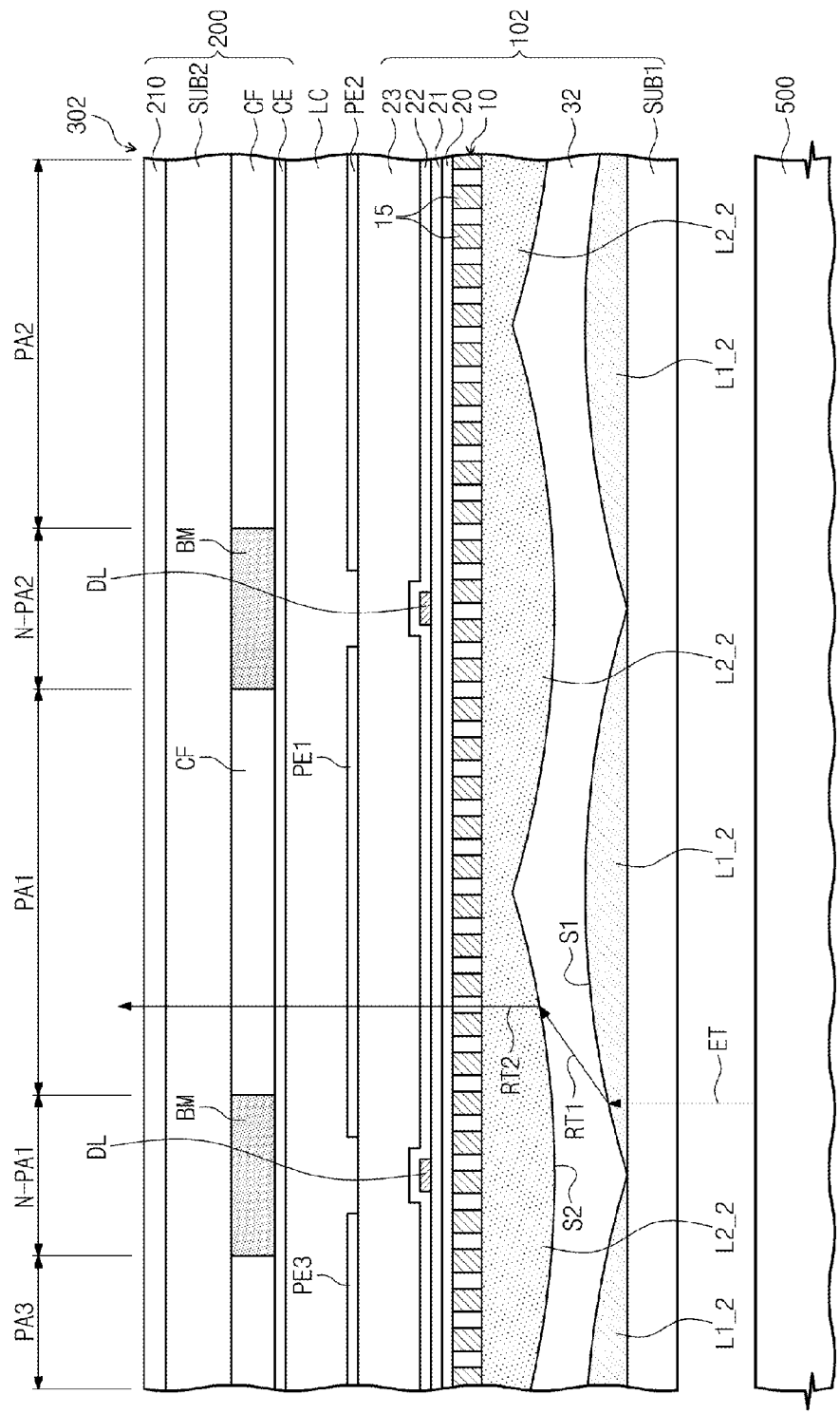

Adverting to FIG. 4, a display panel 302 may include a display substrate 102 and an opposite substrate 200. The display substrate 102 may include a plurality of first optical elements L1_2, an auxiliary layer 32, and a plurality of second optical elements L2_2. The plurality of first optical elements L1_2 and the plurality of second optical elements L2_2 may be alternatingly arranged with the auxiliary layer 32 disposed therebetween. For instance, a trough between adjacent first optical elements L1 may be vertically (or substantially vertically) aligned with an apex of a second optical element L2. To this end, a trough between adjacent second optical elements L2 may be vertically (or substantially vertically) aligned with an apex of a first optical element L1. As opposed to the alignment configuration of the troughs disposed between adjacent second optical elements L2 illustrated in association with FIG. 2B, a trough between adjacent first optical elements L1_2 shown in FIG. 4 may be substantially aligned in association with a corresponding non-pixel area, such as the first non-pixel area N-PA1. Further, it is noted that an overall thickness of the second optical elements L2_2 may be greater than the overall thickness of the first optical elements L1_2.

According to exemplary embodiments, each of the first optical elements L1_2 may have a refractive index greater than the refractive index of the auxiliary layer 32, and each of the second optical elements L2_2 may have a refractive index greater than refractive index of the auxiliary layer 32. In this manner, the first refracting surface S1 may serve as a refracting surface of a concave lens, and the second refracting surface S2 may serve as a refracting surface of a convex lens. As such, an emitting light ET may be refracted at the first refracting surface S1 and the second refracting surface S2, so as to be redirected, and, thereby, propagated toward the first pixel region PA1 in a direction parallel to the normal direction with respect to the first substrate SUB1.

As seen in FIG. 5, a display panel 303 may include a display substrate 103 and the opposite substrate 200. The display substrate 103 may include a plurality of first optical elements L1_3, a first auxiliary layer 33, a plurality of second optical elements L2_3, and a second auxiliary layer 53. The first auxiliary layer 33 may be disposed between the first substrate SUB1 and the plurality of first optical elements L1_3, and the second auxiliary layer 53 may be disposed between the first polarizing plate 10 and the plurality of second optical elements L2_3. To this end, the plurality of second optical elements L2_3 may be disposed directly on the plurality of first optical elements L1_3. Further, the plurality of first optical elements L1_3 and the plurality of second optical elements L2_3 maybe alternatingly arranged with respect to each other. In this manner, an apex of a first optical element L1_3 may be vertically (or substantially vertically) aligned with a corresponding apex of a second optical element L2_3. To this end, a trough between adjacent first optical elements L1_3 may be disposed in association with a non-pixel region, such as the first non-pixel region N-PA1. Further, it is noted that an overall thickness of the first optical elements L1_3 may be greater than the overall thickness of the second optical elements L2_3.

Each of the first optical elements L1_3 may have a first refractive index, the first auxiliary layer 33 may have a second refractive index, the plurality of second optical elements L2_3 may have a third refractive index, and the second auxiliary layer 53 may have a fourth refractive index. In exemplary embodiments, the first refractive index may be greater than the second refractive index and be smaller than the third refractive index. The third refractive index may be greater than the fourth refractive index.

According to exemplary embodiments, the first refracting surface S1 may serve as a refracting surface of a convex lens, and the second refracting surface S2 may serve as a refracting surface of a concave lens. In this manner, an emitting light ET may be refracted at the first refracting surface S1 to be redirected as a first refracted light RT1, and the first refracted light RT1 may be refracted at interface BS between the first and second optical elements L1_3 and L2_3 to be redirected as a second refracted light RT2. Further, the second refracted light RT2 may be refracted at the second refracting surface S2 to be redirected as a third refracted light RT3 propagating toward the first pixel region PA1 in a direction parallel to the normal direction with respect to the first substrate SUB1.

Figure 6:
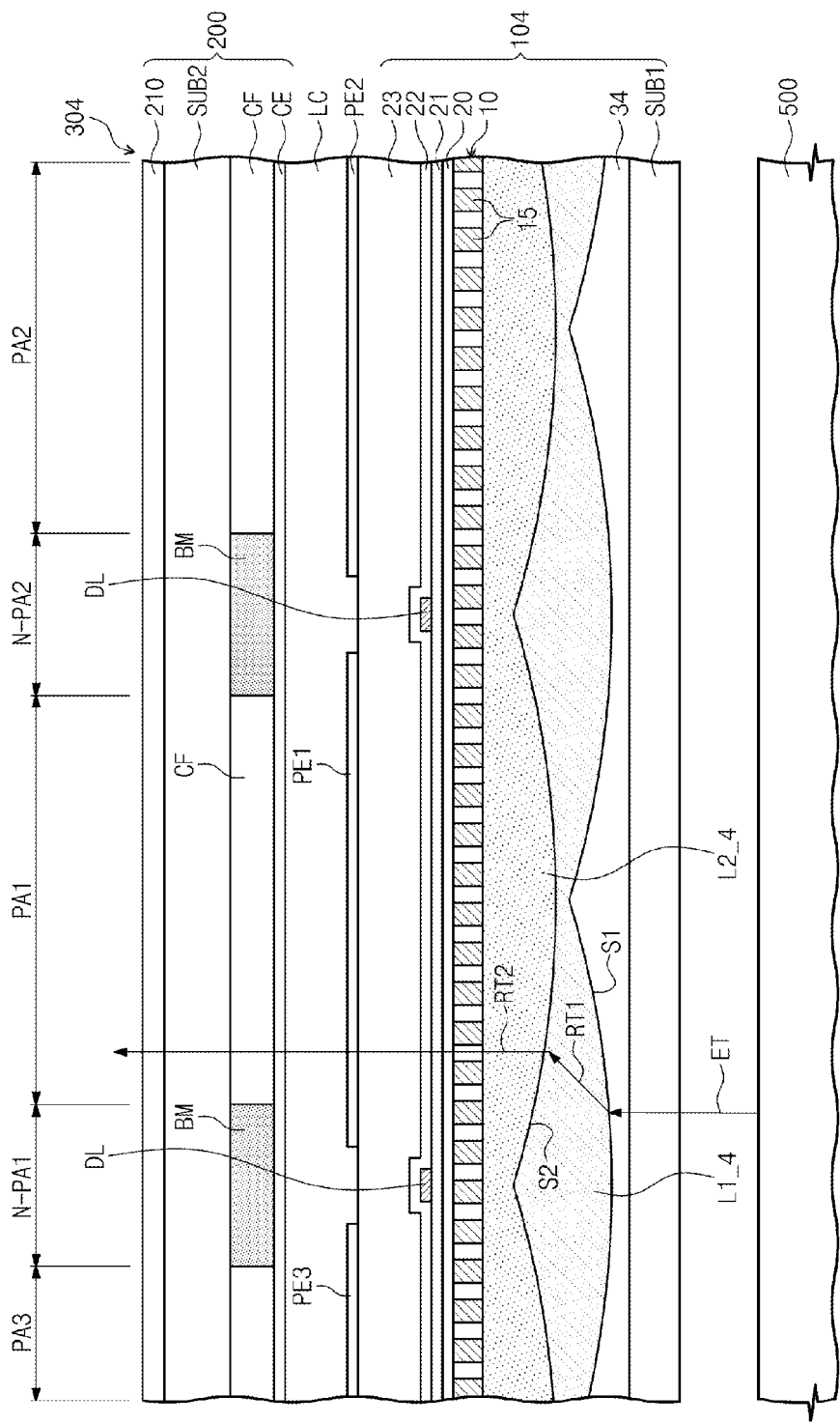

Referring to FIG. 6, a display panel 304 may include a display substrate 104 and the opposite substrate 200. The display substrate 104 may include a plurality of first optical elements L1_4, an auxiliary layer 34, and a plurality of second optical elements L2_4. The auxiliary layer 34 may be provided between the first substrate SUB1 and the plurality of first optical elements L1_4. As opposed to the configuration illustrated in association with FIG. 2B, the display substrate 104 of FIG. 6 includes the second optical elements L2_4 disposed directly on the first optical elements L1_4, such that no auxiliary layer is disposed between the second optical elements L2_4 and the first optical elements L1_4. Further, it is noted that troughs between adjacent second optical elements L2_4 may be disposed in association with corresponding non-pixel regions, such as the first non-pixel region N-PA1. To this end, apexes between adjacent first optical elements L1_4 may also be disposed in association with corresponding non-pixel regions, such as the first non-pixel region N-PA1. In this manner, troughs between adjacent first optical elements L1_4 may be vertically (or substantially vertically) aligned with respective apexes of the second optical elements L2_4.

According to exemplary embodiments, the auxiliary layer 34 may have a refractive index greater than the refractive index of each of the first optical elements L1_4, and each of the first optical elements L1_4 may have a refractive index greater than the refractive index of each of the second optical elements L2_4. In this manner, the first refracting surface S1 may serve as a refracting surface of a convex lens, and the second refracting surface S2 may serve as a refracting surface of a convex lens. As such, an emitting light ET may be refracted at the first refracting surface S1 and the second refracting surface S2, so as to be redirected toward the first pixel region PA1 and in a direction parallel to the normal direction with respect to the first substrate SUB1.

Figure 7:
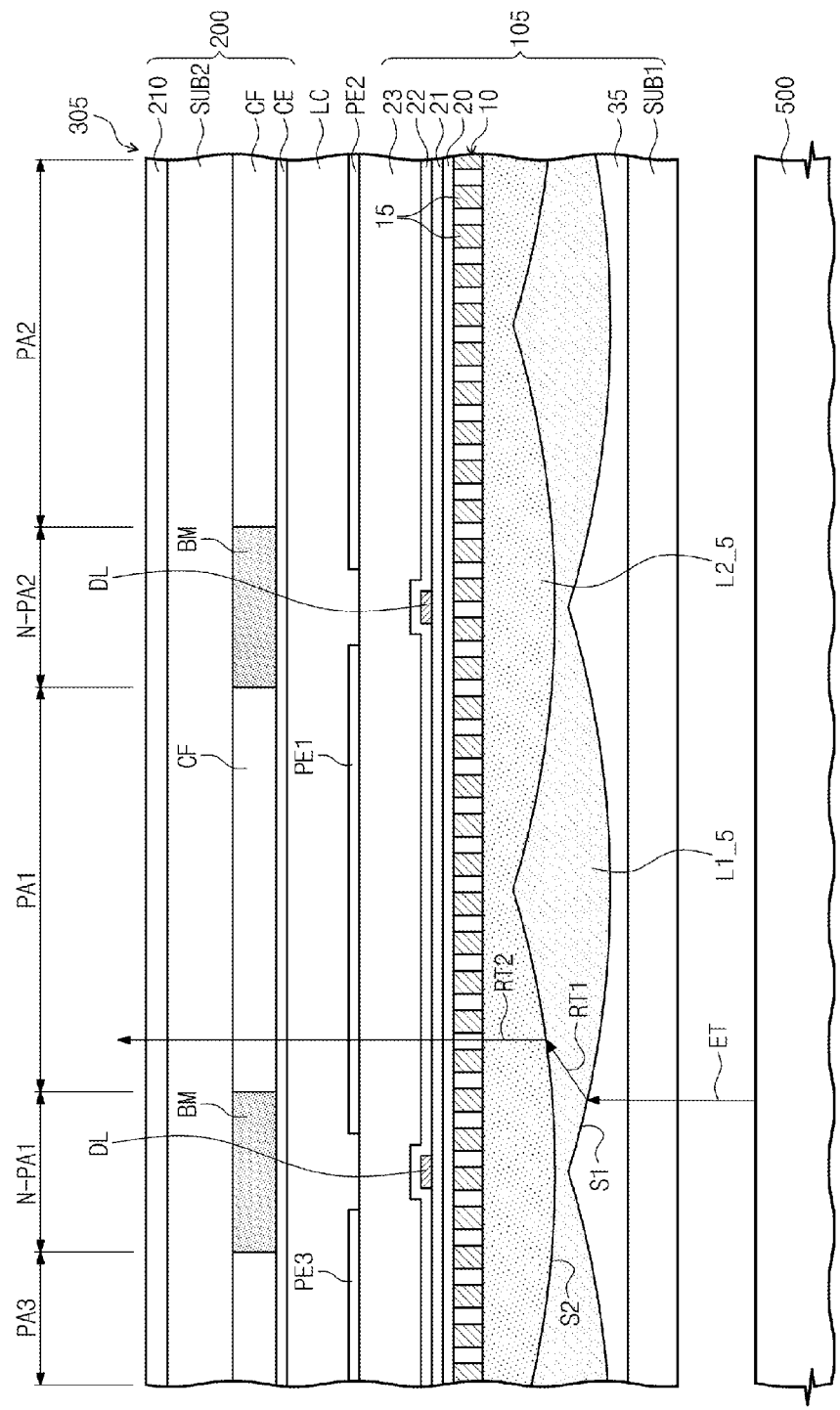

Adverting to FIG. 7, a display panel 305 may include a display substrate 105 and the opposite substrate 200. The display substrate 105 may include a plurality of first optical elements L1_5, an auxiliary layer 35, and a plurality of second optical elements L2_5. The auxiliary layer 35 may be provided between the first substrate SUB1 and the plurality of first optical elements L1_5. In a manner substantially similar to the configuration illustrated in association with FIG. 6, the display substrate 105 of FIG. 7 includes the second optical elements L2_5 disposed directly on the first optical elements L1_5, such that no auxiliary layer is disposed between the second optical elements L2_5 and the first optical elements L1_5. Troughs between adjacent first optical elements L1_5 may be disposed in association with corresponding non-pixel regions, such as the first non-pixel region N-PA1. To this end, apexes between adjacent second optical elements L2_5 may also be disposed in association with corresponding non-pixel regions, such as the first non-pixel region N-PA1. In this manner, troughs between adjacent first optical elements L1_5 may be vertically (or substantially vertically) aligned with respective apexes of the second optical elements L2_5.

According to exemplary embodiments, each of the first optical elements L1_5 may have a refractive index greater than the refractive index of the auxiliary layer 35, and each of the first optical elements L1_5 may have a refractive index that is smaller than the refractive index of each of the second optical elements L2_5. In this manner, the first refracting surface S1 may serve as a refracting surface of a convex lens, and the second refracting surface S2 may serve as a refracting surface of a convex lens. As such, an emitting light ET may be refracted at the first refracting surface S1 and the second refracting surface S2, so as to be redirected and, thereby, propagated toward the first pixel region PA1 in a direction parallel to the normal direction with respect to the first substrate SUB1.

Figure 8:
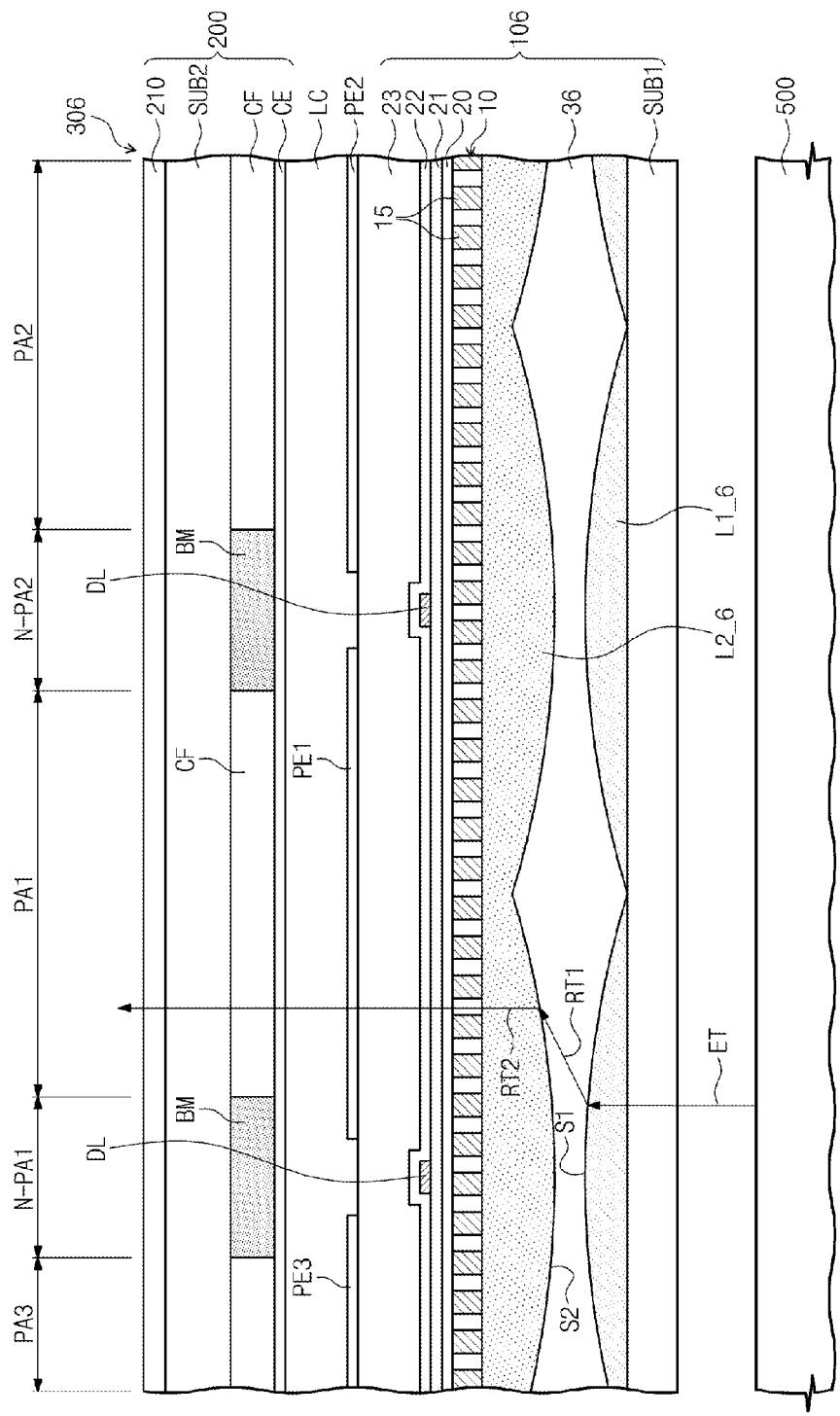

As seen in FIG. 8, a display panel 306 may include a display substrate 106 and the opposite substrate 200. The display substrate 106 may include a plurality of first optical elements L1_6, an auxiliary layer 36, and a plurality of second optical elements L2_6. The auxiliary layer 36 may be provided between the plurality of first optical elements L1_6 and the plurality of second optical elements L2_6. Each of the first optical elements L1_6 may be provided to face a corresponding one of the second optical elements L2_6 with the auxiliary layer 36 disposed therebetween. To this end, respective apexes of the first and second optical elements L1_6 and L2_6 may be vertically (or substantially vertically) aligned with one another. Moreover, the respective apexes of the first and second optical elements L1_6 and L2_6 may be aligned in association with a corresponding non-pixel region, such as the first non-pixel region N-PA1. Further, it is noted that an overall thickness of the second optical elements L2_6 may be greater than the overall thickness of the first optical elements L1_6.

According to exemplary embodiments, each of the first optical elements L1_6 may have a refractive index smaller than the refractive index of the auxiliary layer 36, and the auxiliary layer 36 may have a refractive index smaller than the refractive index of each of the second optical elements L1_6. In this manner, the first refracting surface S1 may serve as a refracting surface of a concave lens, and the second refracting surface S2 may serve as a refracting surface of a convex lens. To this end, an emitting light ET may be refracted at the first refracting surface S1 and the second refracting surface S2, so as to be redirected and, thereby, propagated towards the first pixel region PA1 in a direction parallel to the normal direction with respect to the first substrate SUB1.

Figure 9:
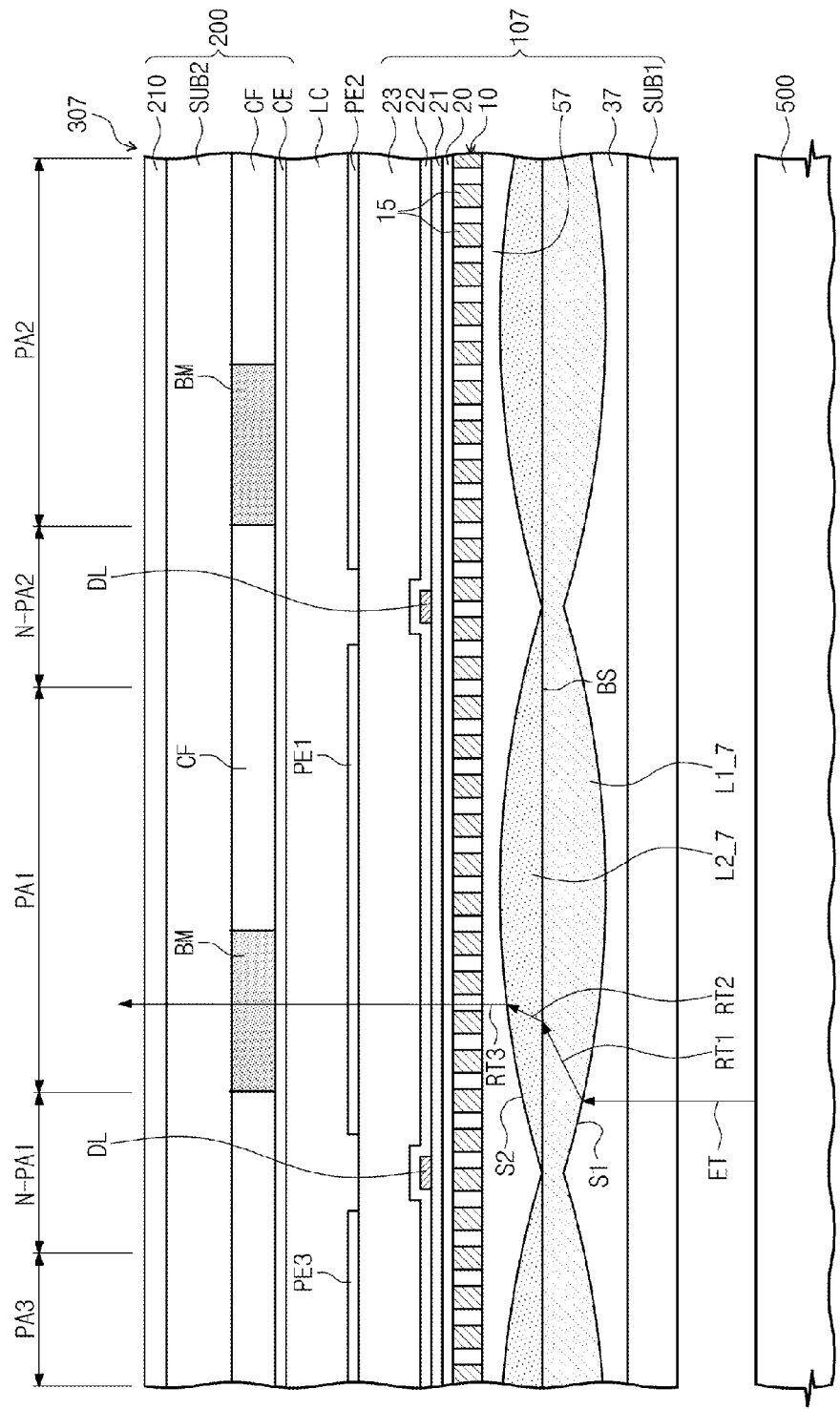

Referring to FIG. 9, a display panel 307 may include a display substrate 107 and the opposite substrate 200. The display substrate 107 may include a plurality of first optical elements L1_7, a first auxiliary layer 37, a plurality of second optical elements L2_7, and a second auxiliary layer 57. The first auxiliary layer 37 may be provided between the first substrate SUB1 and the first optical elements L1_7, and the second auxiliary layer 57 may be provided between the first polarizing plate 10 and the second optical elements L2_7.

In exemplary embodiments, each of the first optical elements L1_7 may have a refractive index greater than the refractive index of the first auxiliary layer 37, and each of the first optical elements L1_7 may have a refractive index smaller than the refractive index of each of the second optical elements L2_7. The second auxiliary layer 57 may have a refractive index greater than the refractive index of each of the second optical elements L2_7. To this end, respective troughs of the first and second optical elements L1_7 and L2_7 may be vertically (or substantially vertically) aligned with one another, as well as respectively aligned in association with a corresponding non-pixel region, such as the first non-pixel region N-PA1. Further, it is noted that an overall thickness of the first optical elements L1_7 may be greater than the overall thickness of the second optical elements L2_7.

According to exemplary embodiments, the first refracting surface S1 may serve as a refracting surface of a convex lens, and the second refracting surface S2 may serve as a refracting surface of a concave lens. As such, the emitting light ET may be refracted at the first refracting surface S1 to be redirected as a first refracted light RT1, and the first refracted light RT1 may be refracted at an interface BS between the first and second optical elements L1_7 and L2_7 to be redirected as a second refracted light RT2. Further, the second refracted light RT2 may be refracted at the second refracting surface S2 to be redirected as a third refracted light RT3 propagating towards the first pixel region PA1 in a direction parallel to the normal direction with respect to the first substrate SUB1.

Figure 10:
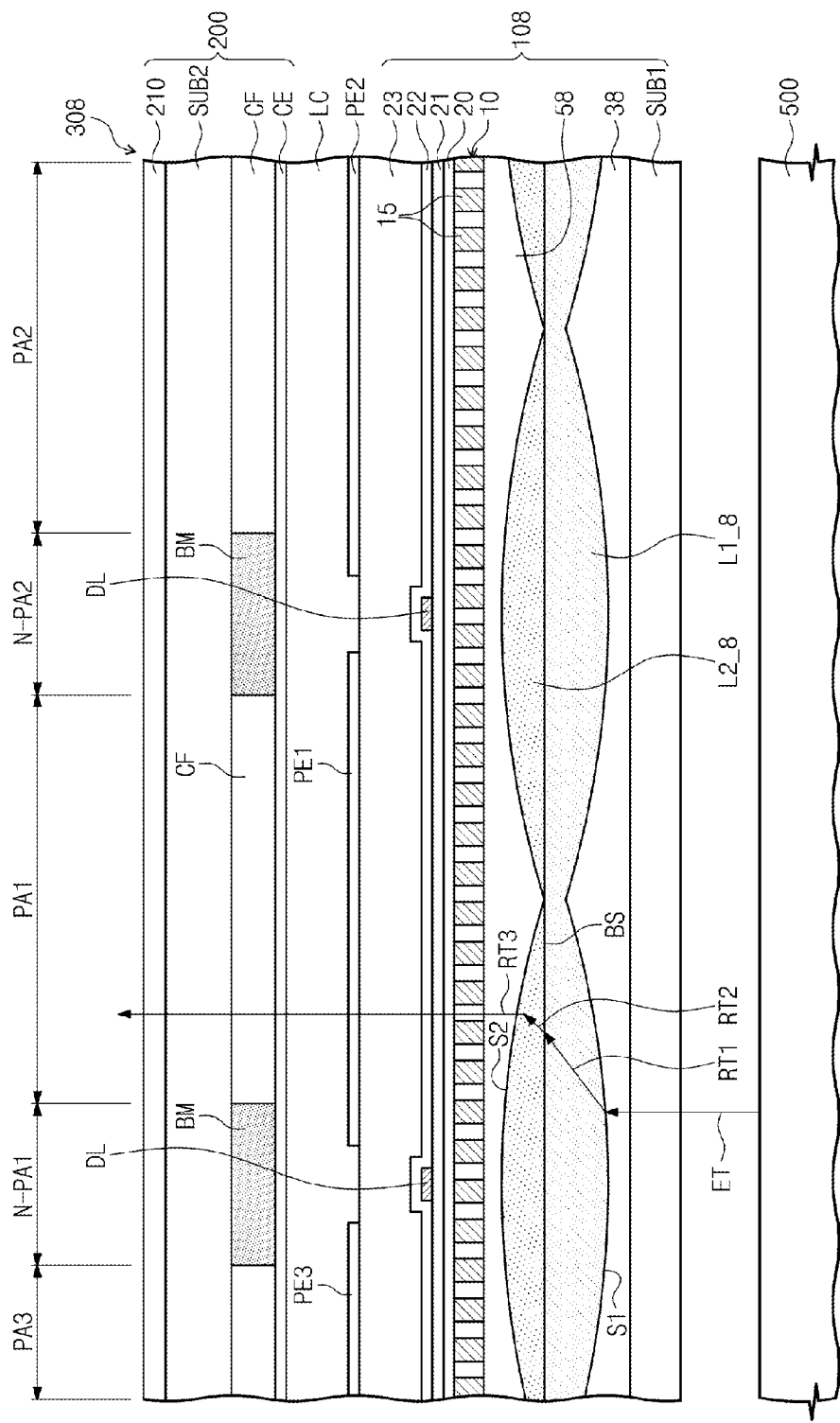

Adverting to FIG. 10, a display panel 308 may include a display substrate 108 and the opposite substrate 200. The display substrate 108 may include a plurality of first optical elements L1_8, a first auxiliary layer 38, a plurality of second optical elements L2_8, and a second auxiliary layer 58. The first auxiliary layer 38 may be provided between the first substrate SUB1 and the first optical elements L1_8, and the second auxiliary layer 58 may be provided between the first polarizing plate 10 and the second optical elements L2_8. To this end, respective apexes of the first and second optical elements L1_8 and L2_8 may be vertically (or substantially vertically) aligned with one another, as well as respectively aligned in association with a corresponding non-pixel region, such as the first non-pixel region N-PA1. Further, it is noted that an overall thickness of the first optical elements L1_8 may be greater than the overall thickness of the second optical elements L2_8.

In exemplary embodiments, each of the first optical elements L1_8 may have a refractive index smaller than the refractive index of the first auxiliary layer 38, and each of the first optical elements L1_8 may have a refractive index smaller than the refractive index of each of the second optical elements L2_8. The second auxiliary layer 58 may have a refractive index smaller than the refractive index of each of the second optical elements L2_8. To this end, the first refracting surface S1 may serve as a refracting surface of a convex lens, and the second refracting surface S2 may serve as a refracting surface of a concave lens. In this manner, an emitting light ET may be refracted at the first refracting surface S1, the interface BS, and the second refracting surface S2, so as to be redirected and, thereby, propagated towards the first pixel region PA1 in a direction parallel to the normal direction with respect to the first substrate SUB1.

Figure 11:
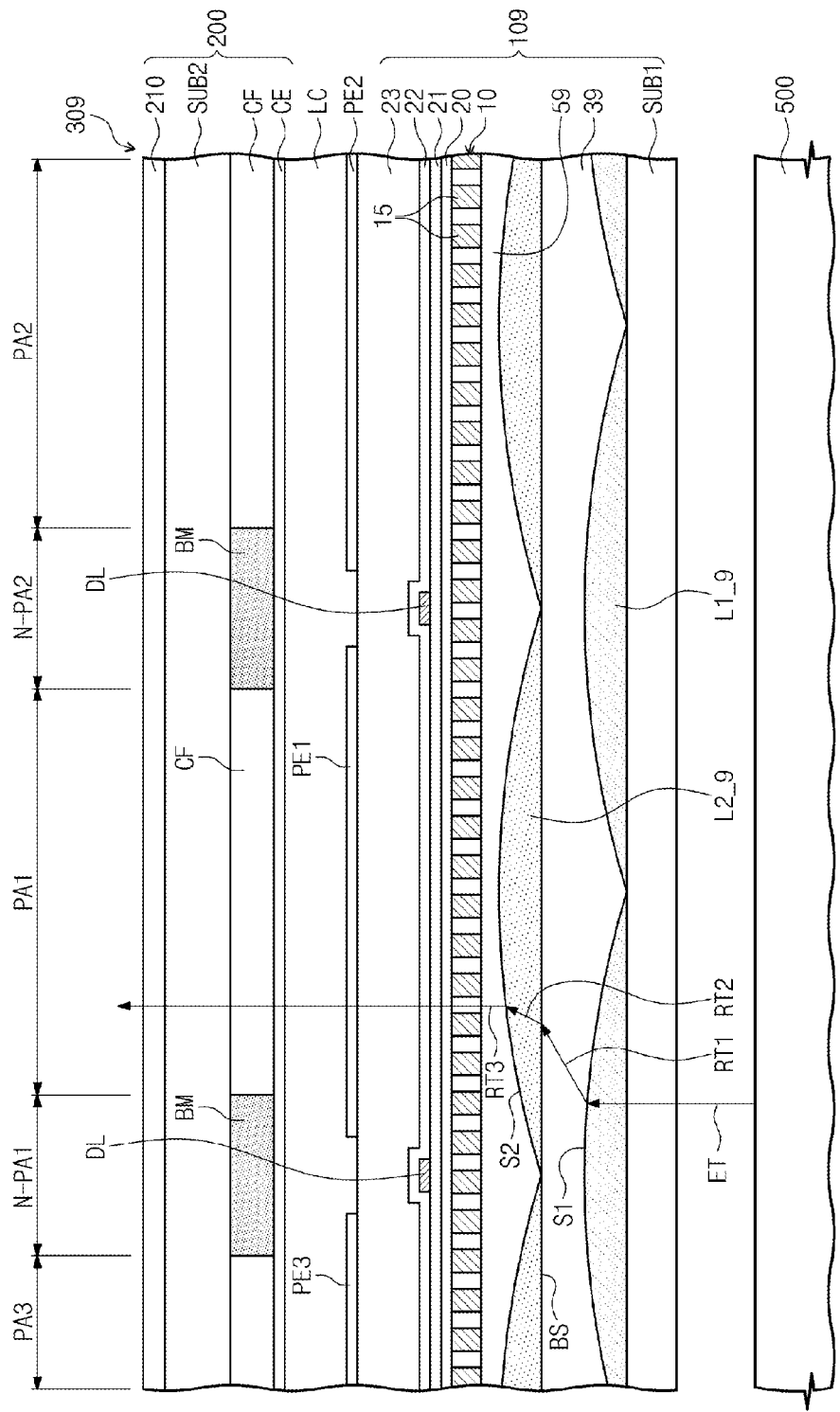

As seen in FIG. 11, a display panel 309 may include a display substrate 109 and the opposite substrate 200. The display substrate 109 may include a plurality of first optical elements L1_9, a first auxiliary layer 39, a plurality of second optical elements L2_9, and a second auxiliary layer 59. The first auxiliary layer 39 may be provided between the first optical elements L1_9 and the second optical elements L2_9, and the second auxiliary layer 59 may be provided between the second optical elements L2_9 and the first polarizing plate 10. Further, it is noted that troughs between adjacent second optical elements L2_9 may be disposed in association with corresponding non-pixel regions, such as the first non-pixel region N-PA1. To this end, apexes between adjacent first optical elements L1_9 may also be disposed in association with corresponding non-pixel regions, such as the first non-pixel region N-PA1. In this manner, troughs between adjacent first optical elements L1_9 may be vertically (or substantially vertically) aligned with respective apexes of the second optical elements L2_9.

According to exemplary embodiments, each of the first optical elements L1_9 may have a refractive index smaller than the refractive index of the first auxiliary layer 39, and the first auxiliary layer 39 may have a refractive index smaller than the refractive index of each of the second optical elements L2_9. The second auxiliary layer 59 may have a refractive index greater than the refractive index of each of the second optical elements L2_9. In this manner, the first refracting surface S1 may serve as a refracting surface of a concave lens, and the second refracting surface S2 may also serve as a refracting surface of a concave lens. As such, an emitting light ET may be refracted at the first refracting surface S1, the interface BS, and the second refracting surface S2, so as to be redirected and, thereby, propagated towards the first pixel region PA1 in a direction parallel to the normal direction with respect to the first substrate SUB1.

Figure 12:
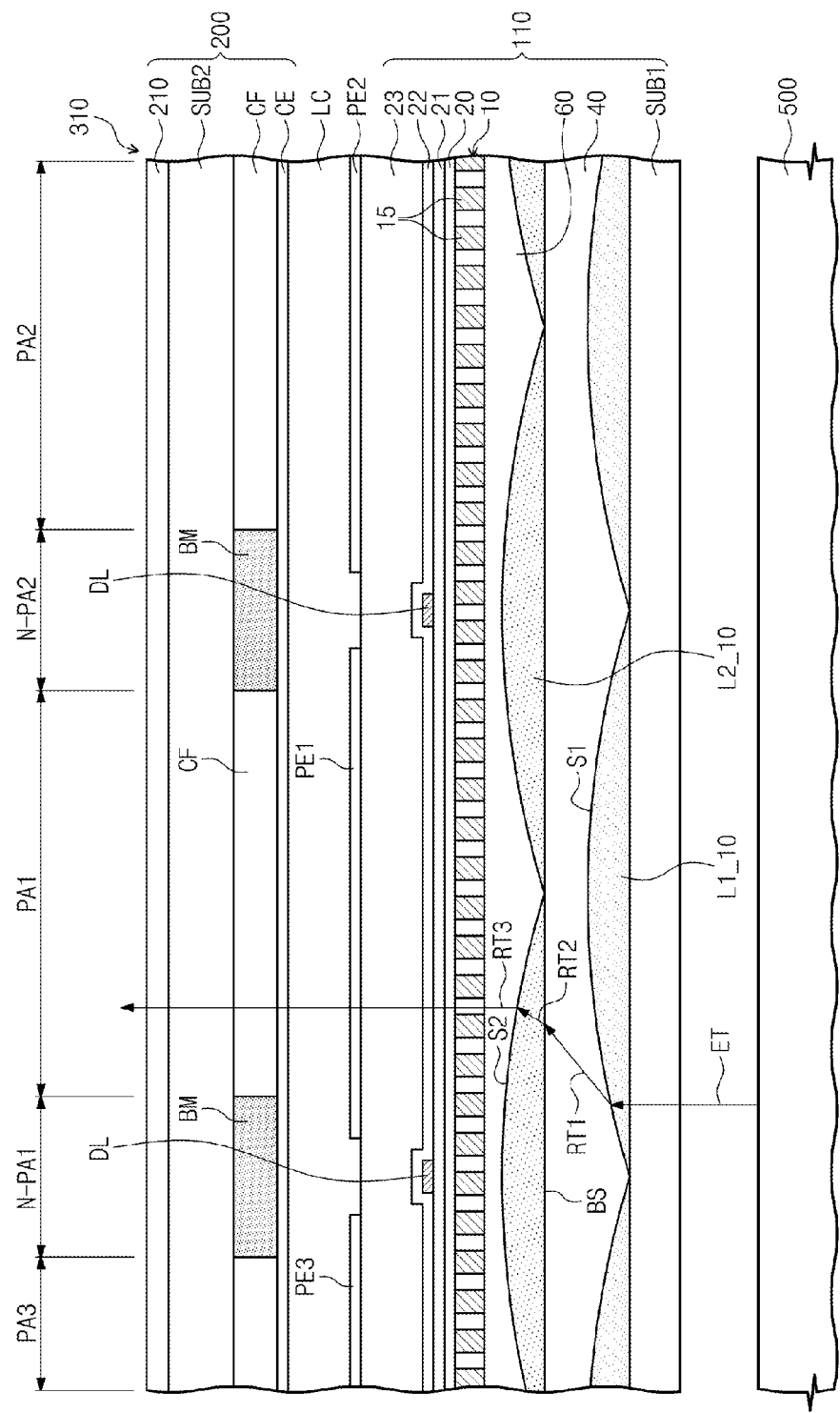

Referring to FIG. 12, a display panel 310 may include a display substrate 110 and the opposite substrate 200. The display substrate 110 may include a plurality of first optical elements L1_10, a first auxiliary layer 40, a plurality of second optical elements L2_10, and a second auxiliary layer 60. The first auxiliary layer 40 may be provided between the first and second optical elements L1_10 and L2_10, and the second auxiliary layer 60 may be provided between the second optical elements L2_10 and the first polarizing plate 10. Further, it is noted that troughs between adjacent first optical elements L1_10 may be disposed in association with corresponding non-pixel regions, such as the first non-pixel region N-PA1. To this end, apexes between adjacent second optical elements L1_10 may also be disposed in association with corresponding non-pixel regions, such as the first non-pixel region N-PA1. In this manner, troughs between adjacent first optical elements L1_10 may be vertically (or substantially vertically) aligned with respective apexes of the second optical elements L2_10.

According to exemplary embodiments, each of the first optical elements L1_10 may have a refractive index greater than the refractive index of the first auxiliary layer 40, and the first auxiliary layer 40 may have a refractive index smaller than the refractive index of each of the second optical elements L2_10. The second auxiliary layer 60 may have a refractive index smaller than the refractive index of each of the second optical elements L2_10. In this manner, the first refracting surface S1 may serve as a refracting surface of a concave lens, and the second refracting surface S2 may also serve as a refracting surface of a concave lens. As such, an emitting light ET may be refracted at the first refracting surface S1, the interface BS, and the second refracting surface S2, so as to be redirected and, thereby, propagated towards the first pixel region PA1 in a direction parallel to the normal direction with respect to the first substrate SUB1.

Figure 13:
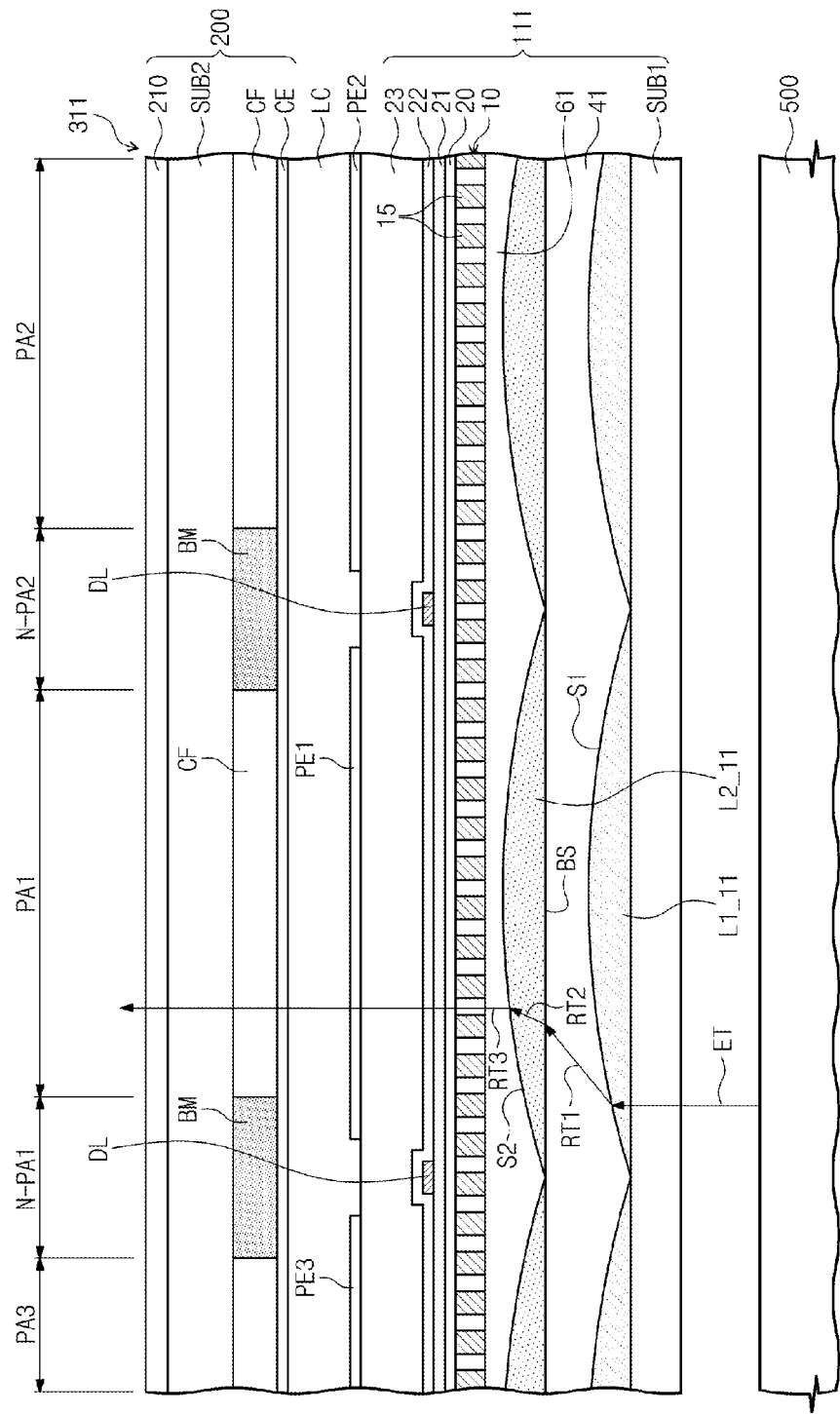

Adverting to FIG. 13, a display panel 311 may include a display substrate 111 and the opposite substrate 200. The display substrate 111 may include a plurality of first optical elements L1_11, a first auxiliary layer 41, a plurality of second optical elements L2_11, and a second auxiliary layer 61. The first auxiliary layer 41 may be provided between the first optical elements L1_11 and the second optical elements L2_11, and the second auxiliary layer 61 may be provided between the second optical elements L2_11 and the first polarizing plate 10. Further, respective troughs between the first and second optical elements L1_11 and L2_11 may be vertically (or substantially vertically) aligned with one another, as well as respectively aligned in association with a corresponding non-pixel region, such as the first non-pixel region N-PA1.

According to exemplary embodiments, each of the first optical elements L1_11 may have a refractive index greater than the refractive index of the first auxiliary layer 41, and the first auxiliary layer 41 may have a refractive index smaller than the refractive index of each of the second optical elements L2_11. The second auxiliary layer 59 may have a refractive index greater than the refractive index of each of the second optical elements L2_9. In this manner, the first refracting surface S1 may serve as a refracting surface of a concave lens, and the second refracting surface S2 may also serve as a refracting surface of a concave lens. As such, an emitting light ET may be refracted at the first refracting surface S1, the interface BS, and the second refracting surface S2, so as to be redirected and, thereby, propagated towards the first pixel region PA1 in a direction parallel to the normal direction with respect to the first substrate SUB1.

Figure 14:
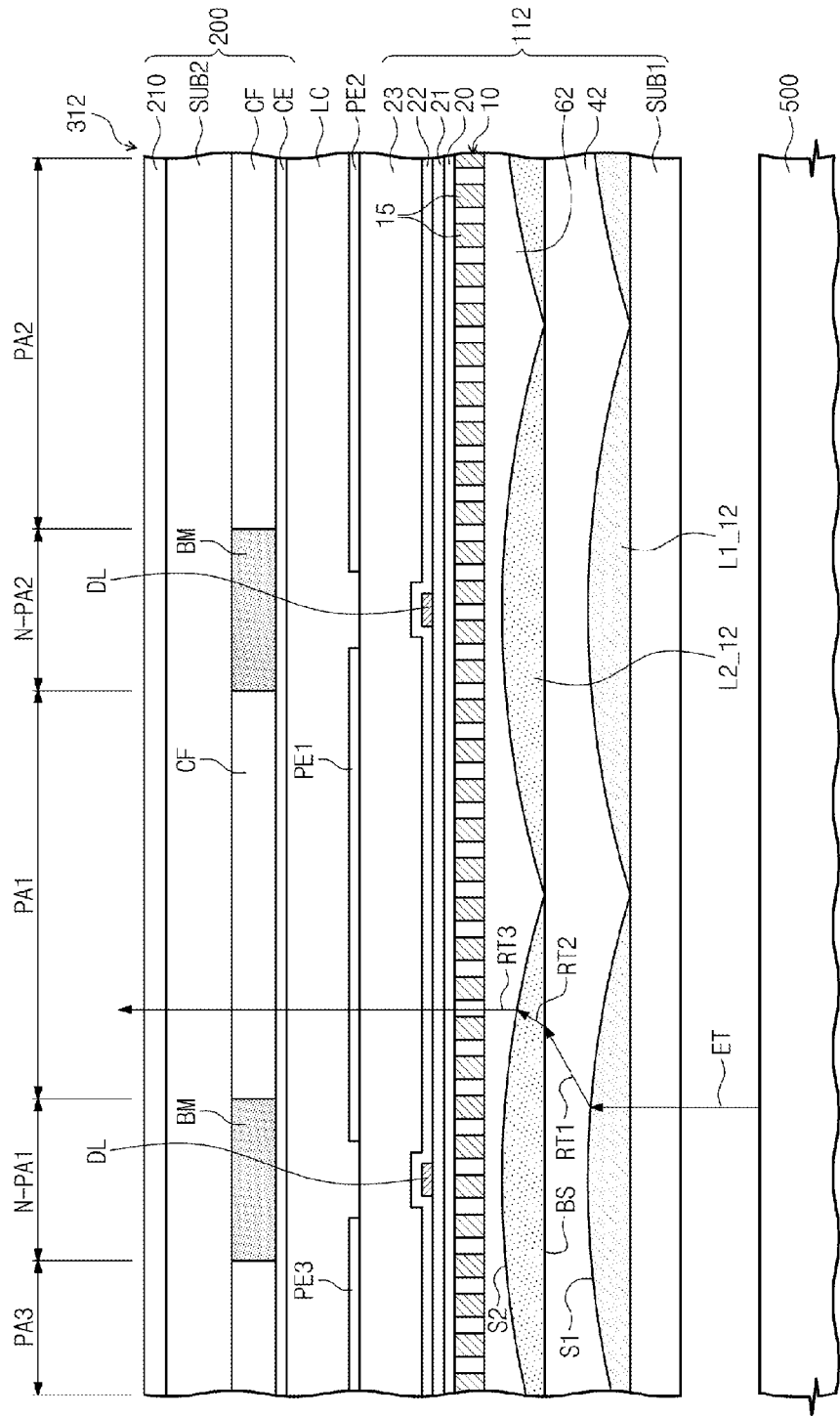

As seen in FIG. 14, a display panel 312 may include a display substrate 112 and the opposite substrate 200. The display substrate 112 may include a plurality of first optical elements L1_12, a first auxiliary layer 42, a plurality of second optical elements L2_12, and a second auxiliary layer 62. The first auxiliary layer 42 may be provided between the first optical elements L1_12 and the second optical elements L2_12, and the second auxiliary layer 62 may be provided between the second optical elements L2_12 and the first polarizing plate 10. To this end, respective apexes of the first and second optical elements L1_12 and L2_12 may be vertically (or substantially vertically) aligned with one another, as well as respectively aligned in association with a corresponding non-pixel region, such as the first non-pixel region N-PA1.

According to exemplary embodiments, each of the first optical elements L1_12 may have a refractive index smaller than the refractive index of the first auxiliary layer 42, and the first auxiliary layer 42 may have a refractive index smaller than the refractive index of each of the second optical elements L2_12. The second auxiliary layer 62 may have a refractive index smaller than the refractive index of each of the second optical elements L2_12. In this manner, the first refracting surface S1 may serve as a refracting surface of a concave lens, and a second refracting surface S2 may also serve as a refracting surface of a concave lens. As such, an emitting light ET may be refracted at the first refracting surface S1, the interface BS, and the second refracting surface S2, so as to be redirected and, thereby, propagated towards the first pixel region PA1 in a direction parallel to the normal direction with respect to the first substrate SUB1.

Figure 15:
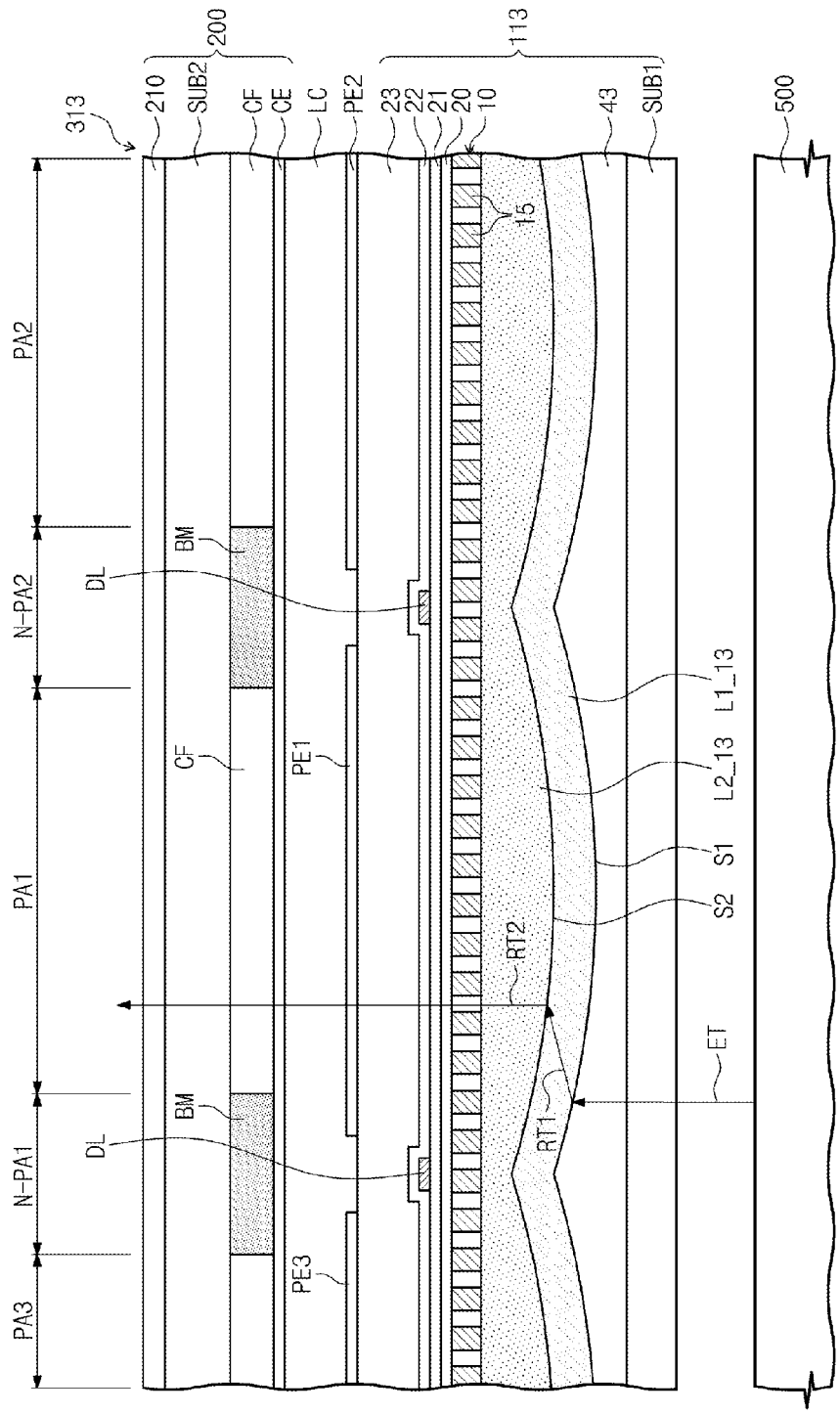

Referring to FIG. 15, a display panel 313 may include a display substrate 113 and the opposite substrate 200. The display substrate 113 may include a plurality of first optical elements L1_13, an auxiliary layer 43, and a plurality of second optical elements L2_13. The auxiliary layer 43 may be provided between the first substrate SUB1 and the first optical elements L1_13. As opposed to the configuration illustrated in association with FIG. 2B, the display substrate 113 of FIG. 15 includes the second optical elements L2_13 disposed directly on the first optical elements L1_13, such that no auxiliary layer is disposed between the second optical elements L2_13 and the first optical elements L1_13. Further, it is noted that troughs between respective adjacent first optical elements L1_13 and respective adjacent second optical elements L2_13 may be disposed in association with corresponding non-pixel regions, such as the first non-pixel region N-PA1. In this manner, the respective troughs between adjacent first optical elements L1_13 and between adjacent second optical elements L2_13 may be vertically (or substantially vertically) aligned with one another, and the respective apexes between adjacent first optical elements L1_13 and between adjacent second optical elements L2_13 may be vertically (or substantially vertically) aligned with one another. Moreover, an overall thickness of the second optical elements L2_13 may be greater than the overall thickness of the first optical elements L1_13.

According to exemplary embodiments, the auxiliary layer 43 may have a refractive index smaller than the refractive index of each of the first optical elements L1_13, and each of the first optical elements L1_13 may have a refractive index greater than the refractive index of each of the second optical elements L2_13. In this manner, the first refracting surface S1 may serve as a refracting surface of a convex lens, and the second refracting surface S2 may also serve as a refracting surface of a convex lens. As such, an emitting light ET may be refracted at the first refracting surface S1 and the second refracting surface S2, so as to be redirected and, thereby, propagated towards the first pixel region PA1 in a direction parallel to the normal direction with respect to the first substrate SUB1.

Figure 16:
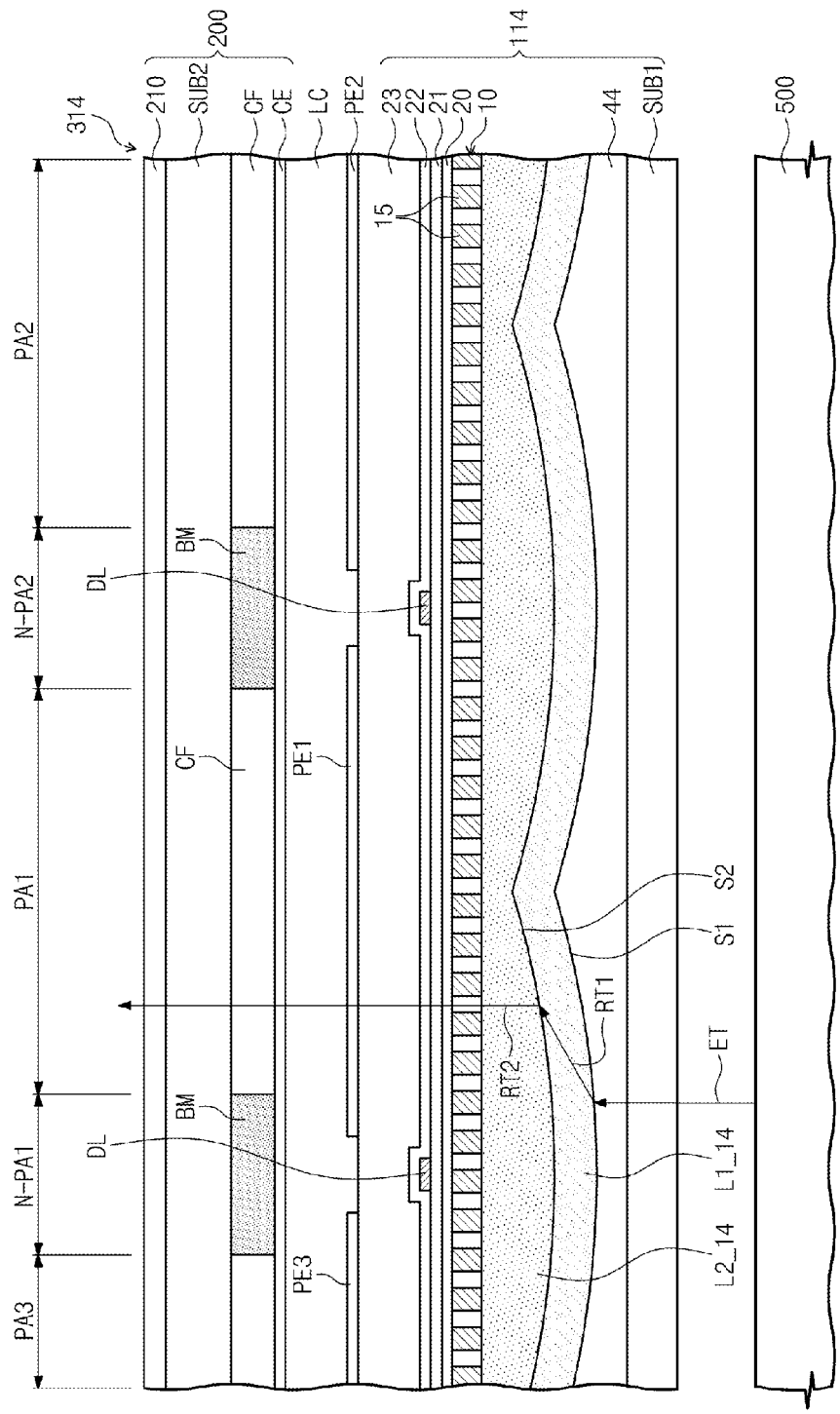

Adverting to FIG. 16, a display panel 314 may include a display substrate 114 and the opposite substrate 200. The display substrate 114 may include a plurality of first optical elements L1_14, an auxiliary layer 44, and a plurality of second optical elements L2_14. The auxiliary layer 44 may be provided between the first substrate SUB1 and the first optical elements L1_14. As opposed to the configuration illustrated in association with FIG. 2B, the display substrate 114 of FIG. 16 includes the second optical elements L2_14 disposed directly on the first optical elements L1_14, such that no auxiliary layer is disposed between the second optical elements L2_14 and the first optical elements L1_14. Further, it is noted that apexes between respective adjacent first optical elements L1_14 and respective adjacent second optical elements L2_14 may be disposed in association with corresponding non-pixel regions, such as the first non-pixel region N-PA1. In this manner, the respective troughs between adjacent first optical elements L1_14 and between adjacent second optical elements L2_14 may be vertically (or substantially vertically) aligned with one another, and the respective apexes between adjacent first optical elements L1_14 and between adjacent second optical elements L2_14 may be vertically (or substantially vertically) aligned with one another. Moreover, an overall thickness of the second optical elements L2_14 may be greater than the overall thickness of the first optical elements L1_14.

According to exemplary embodiments, the auxiliary layer 44 may have a refractive index greater than the refractive index of each of the first optical elements L1_14, and each of the first optical elements L1_14 may have a refractive index smaller than the refractive index of each of the second optical elements L2_14. In this manner, the first refracting surface S1 may serve as a refracting surface of a convex lens, and the second refracting surface S2 may also serve as a refracting surface of a convex lens. As such, an emitting light ET may be refracted at the first refracting surface S1 and the second refracting surface S2, so as to be redirected and, thereby, propagated towards the first pixel region PA1 in a direction parallel to the normal direction with respect to the first substrate SUB1.

Figure 17:
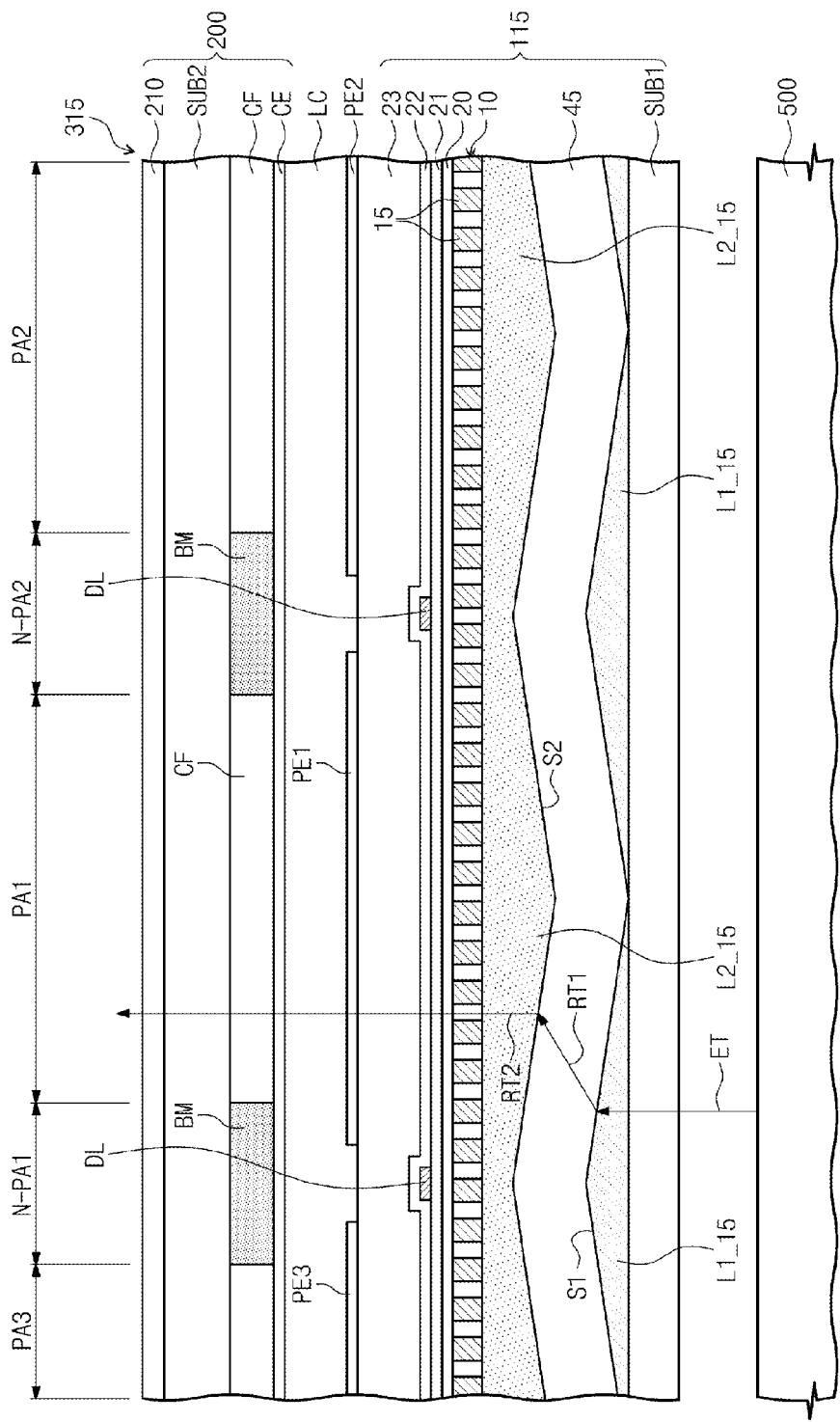

As seen in FIG. 17, a display panel 315 may include a display substrate 115 and the opposite substrate 200. The display substrate 115 may include a plurality of first optical elements L1_15, an auxiliary layer 45, and a plurality of second optical elements L2_15. The auxiliary layer 45 may be provided between the first optical elements L1_15 and the second optical elements L2_15.

In FIG. 2B, each of the first and second optical elements L1 and L2 may be shaped like a lens, and, as such, each of the first and second refracting surfaces S1 and S2 may have a curved (or otherwise arcuate) surface. In FIG. 17, however, the first refracting surface S1 of the first optical elements L1_15 may be a flat, angled surface, and the second refracting surface S2 of the second optical elements L2_15 may be a flat, angled surface. In this manner, the first and second refracting surfaces S1 and S2 may resemble saw tooth surfaces.

Further, it is noted that troughs between adjacent second optical elements L2_15 may be disposed in association with corresponding non-pixel regions, such as the first non-pixel region N-PA1. To this end, apexes between adjacent first optical elements L1_15 may also be disposed in association with corresponding non-pixel regions, such as the first non-pixel region N-PA1. In this manner, troughs between adjacent first optical elements L1_15 may be vertically (or substantially vertically) aligned with respective apexes of the second optical elements L2_15. Moreover, an overall thickness of the second optical elements L2_15 may be greater than the overall thickness of the first optical elements L1_15.

Figure 18:
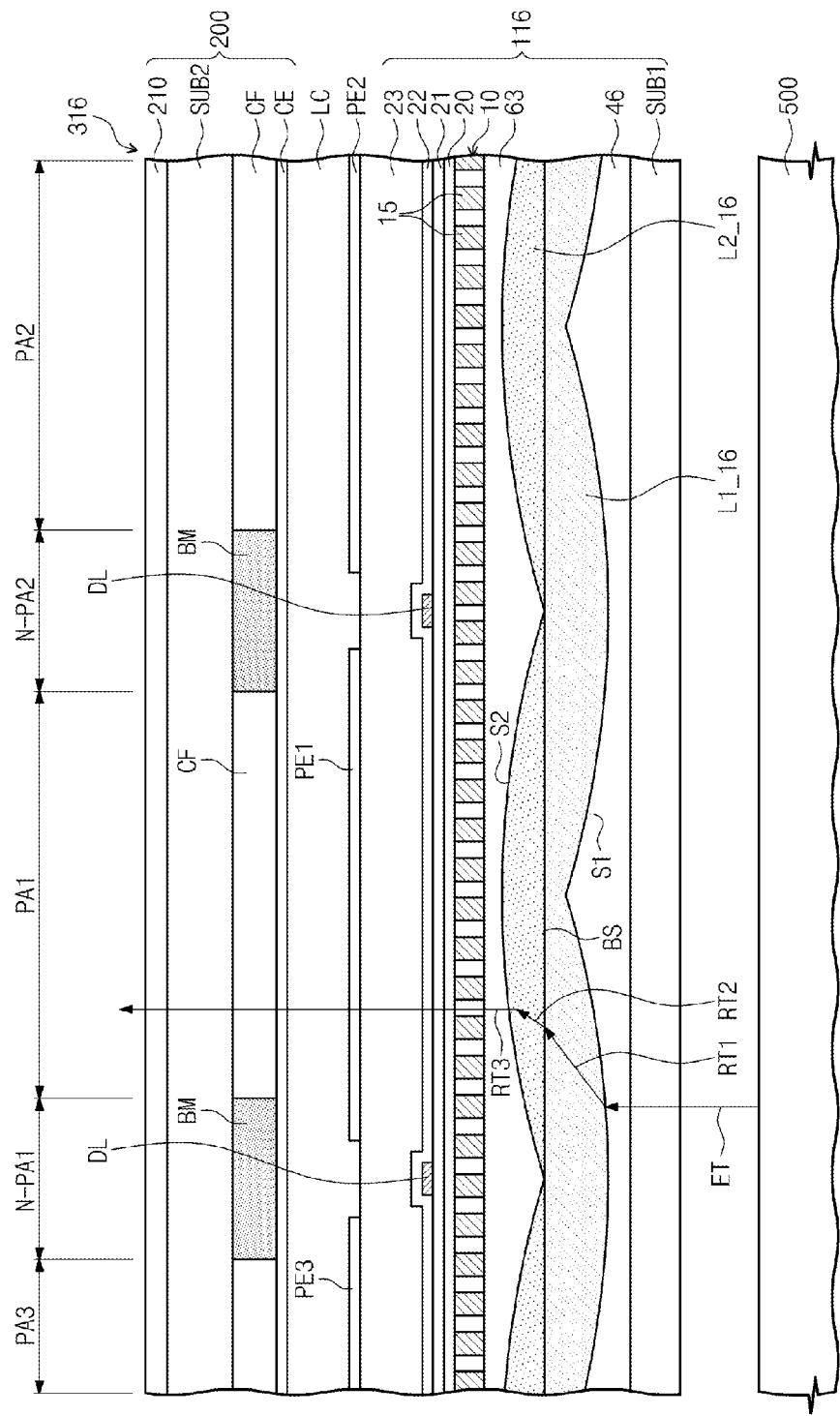

Adverting to FIG. 18, a display panel 316 may include a display substrate 116 and the opposite substrate 200. The display substrate 116 may include a plurality of first optical elements L1_15, a first auxiliary layer 46, a plurality of second optical elements L2_16, and a second auxiliary layer 63. The first auxiliary layer 46 may be disposed between the first substrate SUB1 and the plurality of first optical elements L1_16, and the second auxiliary layer 63 may be disposed between the first polarizing plate 10 and the plurality of second optical elements L2_16.

Each of the first optical elements L1_16 may have a first refractive index, the first auxiliary layer 46 may have a second refractive index, the plurality of second optical elements L2_16 may have a third refractive index, and the second auxiliary layer 63 may have a fourth refractive index. In exemplary embodiments, the first refractive index may be greater than the second refractive index and may be smaller than the third refractive index. The third refractive index may be greater than the fourth refractive index.

According to exemplary embodiments, the first refracting surface S1 may serve as a refracting surface of a convex lens, and the second refracting surface S2 may serve as a refracting surface of a concave lens. In this manner, an emitting light ET may be refracted at the first refracting surface S1 to be redirected as a first refracted light RT1, and the first refracted light RT1 may be refracted at interface BS between the first and second optical elements L1_16 and L2_16 to be redirected as a second refracted light RT2. Further, the second refracted light RT2 may be refracted at the second refracting surface S2 to be redirected as a third refracted light RT3 propagating toward the first pixel region PA1 in a direction parallel to the normal direction with respect to the first substrate SUB1.

As previously described in association with FIG. 5, the plurality of first optical elements L1_3 and the plurality of second optical elements L2_3 were alternatingly arranged with respect to each other. In this manner, a trough between adjacent first optical elements L1_3 as disposed in association with a non-pixel region, such as the first non-pixel region N-PA1. As seen in FIG. 18, however, a trough between adjacent second optical elements L2_16 may be disposed in association with a non-pixel region, such as the first non-pixel region N-PA1. As in FIG. 5, the plurality of first optical elements L1_16 and the plurality of second optical elements L2_16 maybe alternatingly arranged with respect to each other, such that an trough of a first optical element L1_16 may be vertically (or substantially vertically) aligned with a corresponding apex of a second optical element L2_16.

As seen in FIG. 19, a display panel 317 may include a display substrate 117 and the opposite substrate 200. The display substrate 117 may include a plurality of first optical elements L1_17, an auxiliary layer 47, and a plurality of second optical elements L2_17. The auxiliary layer 47 may be provided between the first optical elements L1_17 and the second optical elements L2_17.

In FIG. 4, each of the first and second optical elements L1_2 and L2_2 may be shaped like a lens, and, as such, each of the first and second refracting surfaces S1 and S2 may have a curved (or otherwise arcuate) surface. In FIG. 19, however, the first refracting surface S1 of the first optical elements L1_17 may be a flat, angled surface, and the second refracting surface S2 of the second optical elements L2_17 may be a flat, angled surface. In this manner, the first and second refracting surfaces S1 and S2 may resemble saw tooth surfaces.

Further, it is noted that apexes between adjacent second optical elements L2_17 may be disposed in association with corresponding non-pixel regions, such as the first non-pixel region N-PA1. To this end, troughs between adjacent first optical elements L1_17 may also be disposed in association with corresponding non-pixel regions, such as the first non-pixel region N-PA1. In this manner, troughs between adjacent first optical elements L1_17 may be vertically (or substantially vertically) aligned with respective apexes of the second optical elements L2_17. Moreover, an overall thickness of the second optical elements L2_17 may be greater than the overall thickness of the first optical elements L1_17.

Although not illustrated, each of the first and second optical elements of FIGS. 3-16 and 18 may be replaced with corresponding first and second optical elements including flat, angled surfaces as opposed to the respectively illustrated arcuate surfaces. As previously mentioned, the respective surfaces may additionally or alternatively be configured as a Fresnel lens or any other suitable shape to achieve one or more of the light redirecting effects described herein.

Although not illustrated, when exemplary embodiments are utilized in association with self-emissive display devices, at least the first and second optical elements may be utilized to direct self-emitted light from a non-pixel region through a pixel region to increase light efficiency and/or frontal brightness. In this manner, at least the first and second optical elements may be disposed between a substrate including a light emitting component of the associated display device and the light shielding layer BM. It is noted that the backlight assembly 500 may be omitted in such embodiments.

According to exemplary embodiments, a fraction of emitting light propagating toward a non-pixel region may be redirected by first and second optical elements, and, thereby, be emitted through a pixel region of a corresponding display panel. As such, the redirected fraction of the emitting light may be used to facilitate the display of an image via the display panel. This may increase the light efficiency associated with the backlight assembly. Further, since the light redirected by the first and second optical elements may be emitted in a direction normal to a substrate surface, a frontal brightness of the display panel may be increased.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A display device, comprising:
a light providing assembly configured to provide light; and
a display panel configured to display an image using the light,
wherein the display panel comprises:
a first substrate comprising a pixel region and a non-pixel region adjacent to the pixel region;
a second substrate facing the first substrate;
a liquid crystal layer disposed between the first substrate and the second substrate;
a polarizing plate disposed between the first substrate and the liquid crystal layer, the polarizing plate comprising grid polarizing layers;
a first optical element disposed between the first substrate and the polarizing plate, the first optical element being configured to redirect a fraction of the light propagating toward the non-pixel region in a first direction; and
a second optical element disposed between the first optical element and the polarizing plate, the second optical element being configured to redirect the fraction of light propagating in the first direction toward the pixel region, and
wherein each of the first optical element and the second optical element is embedded in the display panel.

2. The display device of claim 1, wherein the first direction is deflected from a second direction normal to the first substrate.

3. The display device of claim 2, wherein the fraction of light redirected by the second optical element propagates in the second direction.

4. The display device of claim 2, wherein:
at least a first portion of each of the first and second optical elements overlaps with respective portions of the non-pixel region; and
at least a second portion of each of the first and second optical elements overlaps with respective portions of the pixel region.

5. The display device of claim 4, wherein:
the first optical element comprises a first surface configured to redirect incident light in the first direction;
the second optical element comprises a second surface configured to redirect incident light in the second direction;

the first surface overlaps at least a portion of each of the pixel region, the non-pixel region, and another pixel region adjacent to the non-pixel region; and the second surface faces the first surface.

6. The display device of claim 4, wherein:

the first optical element comprises a first surface configured to redirect incident light in the first direction;

the second optical element comprises a second surface configured to redirected incident light in the second direction;

the first surface overlaps at least a portion of each of the non-pixel region, the pixel region, and another non-pixel region adjacent to the pixel region; and the second surface faces the first surface.

7. The display device of claim 4, wherein:

the first optical element comprises a first surface configured to redirect incident light in the first direction;

the second optical element comprises a second surface configured to redirect incident light in the second direction;

the first substrate further comprises another pixel region, and another non-pixel region, the pixel region, the non-pixel region, the another pixel region, and the another non-pixel region being sequentially disposed adjacent to one another;

one of the first and second surfaces overlaps at least a portion of each of the pixel region, the non-pixel region, and the another pixel region; and the other of the first and second surfaces overlaps at least a portion of each of the non-pixel region, the another pixel region, and the another non-pixel region.

8. The display device of claim 4, further comprising:

an auxiliary layer disposed between the first and second optical elements, wherein a refractive index of the first optical element is different from a refractive index of the auxiliary layer, and wherein a refractive index of the second optical element is different from the refractive index of the auxiliary layer.

9. The display device of claim 4, further comprising:

an auxiliary layer disposed between the first optical element and the first substrate, wherein a refractive index of the first optical element is different from a refractive index of the auxiliary layer, and wherein the refractive index of the first optical element is different from a refractive index of the second optical element.

10. The display device of claim 4, further comprising:

a first auxiliary layer disposed between the first optical element and the second optical element; and a second auxiliary layer disposed between the second optical element and the first polarizing plate, wherein a refractive index of the first optical element is different a refractive index of the first auxiliary layer, and wherein a refractive index of the second optical element is different from each of the refractive index of the first auxiliary layer and a refractive index of the second auxiliary layer.

11. The display device of claim 4, further comprising:

a first auxiliary layer disposed between the first substrate and the first optical element; and a second auxiliary layer disposed between the second optical element and the polarizing plate, wherein a refractive index of the first optical element is different from each of a refractive index of the first auxiliary layer and a refractive index of the second optical element, and wherein the refractive index of the second optical element is different from a refractive index of the second auxiliary layer.

12. The display device of claim 1, wherein each of the first and second optical elements comprises a thickness that decreases with increasing distance from a center thereof.

13. The display device of claim 12, wherein each of the first and second optical elements comprises an arcuately shaped surface configured to directed incident light.

14. The display device of claim 13, wherein each of the arcuately shaped surfaces convexly protrude toward the first substrate.

15. The display device of claim 13, wherein each of the arcuately shaped surfaces convexly protrude toward the polarizing plate.

16. The display device of claim 13, wherein:

one of the first and second optical elements convexly protrudes toward the first substrate; and the other of the first and second optical elements convexly protrudes toward the polarizing plate.

17. The display device of claim 12, wherein at least one of the first and second optical elements comprises a flat, angled surface configured to redirect incident light.

18. The display device of claim 1, wherein:

the first optical element comprises an arcuately shaped surface configured to redirect incident light in the first direction, the arcuately shaped surface comprising an apex and a trough;

one of the apex and the trough is disposed in association with the non-pixel region; and the other of the apex and the trough is disposed in association with the pixel region.

19. A display device, comprising:

a light providing assembly configured to provide light; and a display panel configured to display an image using the light, wherein the display panel comprises:

a first substrate comprising a pixel region and a non-pixel region adjacent to the pixel region, the pixel region being configured to transmit incident light;

a light shielding layer disposed on the first substrate and in association with the non-pixel region, the light shielding layer being configured to block incident light propagating in association with the non-pixel region;

a first optical element disposed between the first substrate and the light shielding layer, the first optical element being configured to redirect, in a first direction, at least some of the light propagating in association with the non-pixel region; and a second optical element disposed between the first optical element and the light shielding layer, the second optical element being configured to redirect the at least some of the light propagating in the first direction to propagate in association with the pixel region, and wherein each of the first optical element and the second optical element is embedded in the display panel.

* * * * *